US011823463B2

(12) United States Patent
Shirai et al.

(10) Patent No.: US 11,823,463 B2
(45) Date of Patent: Nov. 21, 2023

(54) VEHICLE PERIPHERY MONITORING DEVICE

(71) Applicant: TOYOTA JIDOSHA KABUSHIKI KAISHA, Toyota (JP)

(72) Inventors: Ryo Shirai, Miyoshi (JP); Tomoaki Iida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 628 days.

(21) Appl. No.: 17/074,775

(22) Filed: Oct. 20, 2020

(65) Prior Publication Data

US 2021/0256271 A1    Aug. 19, 2021

(30) Foreign Application Priority Data

Feb. 13, 2020 (JP) ................. 2020-022071

(51) Int. Cl.
| | |
|---|---|
| *G06V 20/56* | (2022.01) |
| *B60W 40/105* | (2012.01) |
| *B60R 1/27* | (2022.01) |
| *G06V 20/58* | (2022.01) |

(52) U.S. Cl.
CPC ............. *G06V 20/56* (2022.01); *B60R 1/27* (2022.01); *B60W 40/105* (2013.01); *G06V 20/58* (2022.01); *B60R 2300/105* (2013.01); *B60R 2300/302* (2013.01); *B60R 2300/8086* (2013.01); *B60W 2420/42* (2013.01); *B60W 2520/06* (2013.01)

(58) Field of Classification Search
CPC ............. B60R 1/00; B60R 2300/105; B60R 2300/302; B60R 2300/8086; B60W 2420/42; B60W 40/105; B60W 2520/06; G06V 20/56; G06V 20/58
See application file for complete search history.

(56) References Cited

U.S. PATENT DOCUMENTS

| | | | |
|---|---|---|---|
| 10,363,872 B2 * | 7/2019 | Kubota | ............ B60R 1/00 |
| 2008/0012940 A1 | 1/2008 | Kanaoka et al. | |
| 2015/0307024 A1 * | 10/2015 | Fukuda | ......... G06V 20/58 |
| | | | 382/103 |
| 2017/0372147 A1 * | 12/2017 | Stervik | ............ B60R 1/00 |
| 2018/0111553 A1 | 4/2018 | Kubota et al. | |

(Continued)

FOREIGN PATENT DOCUMENTS

| | | |
|---|---|---|
| CN | 107431787 A | 12/2017 |
| CN | 107547864 A | 1/2018 |
| JP | 2003191810 A | 7/2003 |

(Continued)

*Primary Examiner* — Daniel G Mariam
(74) *Attorney, Agent, or Firm* — Dickinson Wright, PLLC

(57) ABSTRACT

A vehicle periphery monitoring device stores images photographed with a front camera, a rear camera, a left side camera, and a right side camera as a past front image, a past rear image, a past left side image, and a past right side image, respectively. When a vehicle travels while making a turn, the vehicle periphery monitoring device generates an underfloor image indicating a condition of an underfloor of the vehicle using at least one of the past front image and the past rear image and at least one of the past left side image and the past right side image. The vehicle periphery monitoring device displays the generated underfloor image on a display.

12 Claims, 25 Drawing Sheets

(56) References Cited

U.S. PATENT DOCUMENTS

2020/0267353 A1    8/2020   Ishida et al.

FOREIGN PATENT DOCUMENTS

| JP | 2008033901 A | 2/2008 |
| JP | 2016197785 A | 11/2016 |
| JP | 2019087980 A | 6/2019 |
| JP | 2019197953 A | 11/2019 |

* cited by examiner

VEHICLE PERIPHERY MONITORING DEVICE

CROSS-REFERENCE TO RELATED APPLICATION

This application claims priority to Japanese Patent Application No. 2020-022071 filed on Feb. 13, 2020, incorporated herein by reference in its entirety.

BACKGROUND

1. Technical Field

The present disclosure relates to a vehicle periphery monitoring device.

2. Description of Related Art

Vehicle periphery monitoring devices that display on a display an image (hereinafter "an underfloor image") indicating the condition of an underfloor of a vehicle are known. As such a vehicle periphery monitoring device, there is known a vehicle periphery monitoring device that photographs an image of an area in front of a vehicle with a camera while the vehicle moves forward, stores data on the image (hereinafter "image data"), generates an underfloor image using the stored image data when a prescribed time lapses after the image data is stored, and displays the generated underfloor image on the display (see, for example, Japanese Patent Application Publication No. 2016-197785).

SUMMARY

Conventional vehicle periphery monitoring devices are designed to use only the image data on an area in front of a vehicle when generating an underfloor image. Therefore, the conventional vehicle periphery monitoring devices can generate an underfloor image, only when the vehicle moves straight forward. When the vehicle moves forward while making a left turn or a right turn, the conventional vehicle periphery monitoring devices cannot generate an underfloor image.

The present disclosure has been made in order to cope with the above-stated problem. Specifically, an object of the present disclosure is to provide a vehicle periphery monitoring device capable of generating an underfloor image and displaying the image on a display when a vehicle travels while making a left turn or a right turn.

A vehicle periphery monitoring device according to the present disclosure includes: a front camera; a rear camera; a left side camera; and a right side camera. The front camera is configured to photograph an area in front of the vehicle. The rear camera is configured to photograph an area behind the vehicle. The left side camera is configured to photograph an area on a left side of the vehicle. The right side camera is configured to photograph an area on a right side of the vehicle.

The vehicle periphery monitoring device according to the present disclosure stores images photographed with the front camera, the rear camera, the left side camera, and the right side camera as a past front image, a past rear image, a past left side image, and a past right side image, respectively. Then, when the vehicle moves straight forward, the vehicle periphery monitoring device according to the present disclosure generates an image indicating a condition of an underfloor of the vehicle as an underfloor image using the past front image. When the vehicle moves straight backward, the vehicle periphery monitoring device generates the underfloor image using the past rear image. The vehicle periphery monitoring device displays the generated underfloor image on a display.

Furthermore, when the vehicle travels while making a turn, the vehicle periphery monitoring device according to the present disclosure is configured to generate the underfloor image using at least one of the past front image and the past rear image, and at least one of the past left side image and the past right side image.

When the vehicle travels while making a turn, the vehicle periphery monitoring device according to the present disclosure uses the past left side image or the past right side image for generation of the underfloor image. Therefore, the underfloor image can be generated even when the vehicle travels while making a turn.

When a traveling speed of the vehicle is equal to or less than a prescribed speed, the vehicle periphery monitoring device according to the present disclosure may be configured to generate the underfloor image. When the traveling speed of the vehicle is larger than the prescribed speed, the vehicle periphery monitoring device may be configured not to generate the underfloor image.

When the traveling speed of the vehicle is large, there is a low possibility that a driver of the vehicle sees the underfloor image. Hence, the necessity of generating the underfloor image is also low. When the necessity of generating the underfloor image is low, the vehicle periphery monitoring device according to the present disclosure does not generate the underfloor image. This makes it possible to reduce arithmetic load of the vehicle periphery monitoring device.

Furthermore, when the vehicle travels while making a turn, the vehicle periphery monitoring device according to the present disclosure may be configured to store only one of the past front image and the past rear image without storing the other one of the past front image and the past rear image, and store only one of the past left side image and the past right side image without storing the other one of the past left side image and the past right side image, in accordance with a traveling direction of the vehicle and a turning direction of the vehicle. This makes it possible to reduce the amount of images to be stored.

When steering wheels of the vehicle are front wheels, and the vehicle moves forward while making a left turn, the vehicle periphery monitoring device according to the present disclosure may be configured to store the past front image without storing the past rear image, and store the past left side image without storing the past right side image. When the vehicle moves forward while making a right turn, the vehicle periphery monitoring device may be configured to store the past front image without storing the past rear image, and store the past right side image without storing the past left side image. This makes it possible to reduce the amount of images to be stored.

Furthermore, when steering wheels of the vehicle are front wheels and the vehicle moves backward while making a left turn, the vehicle periphery monitoring device according to the present disclosure may be configured to store the past rear image without storing the past front image, and store the past right side image without storing the past left side image. When the vehicle moves backward while making a right turn, the vehicle periphery monitoring device may be configured to store the past rear image without storing the past front image, and store the past left side image without storing the past right side image. This makes it possible to reduce the amount of images to be stored.

When the vehicle travels while making a turn, and a turning radius of the vehicle is smaller than a prescribed radius, the vehicle periphery monitoring device according to the present disclosure may be configured to store only one of the past front image and the past rear image without storing the other one of the past front image and the past rear image, and store only one of the past left side image and the past right side image without storing the other one of the past left side image and the past right side image, in accordance with the traveling direction of the vehicle and the turning direction of the vehicle. When the vehicle travels while making a turn, and the turning radius of the vehicle is equal to or more than the prescribed radius, the vehicle periphery monitoring device may be configured to store only one of the past front image and the past rear image without storing the other one of the past front image and the past rear image, and be configured not to store the past left side image and the past right side image, in accordance with the traveling direction of the vehicle. This makes it possible to reduce the amount of images to be stored.

When steering wheels of the vehicle is front wheels, and when the vehicle moves forward while making a left turn, and a turning radius is smaller than a prescribed radius, the vehicle periphery monitoring device according to the present disclosure may be configured to store the past front image without storing the past rear image, and store the past left side image without storing the past right side image. When the vehicle moves forward while making a left turn, and the turning radius of the vehicle is equal to or more than the prescribed radius, the vehicle periphery monitoring device may be configured to store the past front image without storing the past rear image, and be configured not to store both the past left side image and the past right side image. When the vehicle moves forward while making a right turn, and the turning radius is smaller than the prescribed radius, the vehicle periphery monitoring device may be configured to store the past front image without storing the past rear image, and store the past right side image without storing the past left side image. When the vehicle moves forward while making a right turn, and the turning radius of the vehicle is equal to or more than the prescribed radius, the vehicle periphery monitoring device may be configured to store the past front image without storing the past rear image, and be configured not to store both the past left side image and the past right side image. This makes it possible to reduce the amount of images to be stored.

In this case, when the vehicle moves forward while making a left turn, and the turning radius is smaller than the prescribed radius, the vehicle periphery monitoring device according to the present disclosure may be configured to generate the underfloor image using the past front image and the past left side image. When the vehicle moves forward while making a left turn, and the turning radius is equal to or more than the prescribed radius, the vehicle periphery monitoring device may be configured to generate the underfloor image using only the past front image. When the vehicle moves forward while making a right turn, and the turning radius is smaller than the prescribed radius, the vehicle periphery monitoring device may be configured to generate the underfloor image using the past front image and the past right side image. When the vehicle moves forward while making a right turn, and the turning radius is equal to or more than the prescribed radius, the vehicle periphery monitoring device may be configured to generate the underfloor image using only the past front image.

When steering wheels of the vehicle are front wheels and when the vehicle moves backward while making a left turn, and a turning radius is smaller than a prescribed radius, the vehicle periphery monitoring device according to the present disclosure may be configured to store the past rear image without storing the past front image, and store the past right side image without storing the past left side image. When the vehicle moves backward while making a left turn, and the turning radius of the vehicle is equal to or more than the prescribed radius, the vehicle periphery monitoring device may be configured to store the past rear image without storing the past front image, and be configured not to store both the past left side image and the past right side image. When the vehicle moves backward while making a right turn, and the turning radius is smaller than the prescribed radius, the vehicle periphery monitoring device may be configured to store the past rear image without storing the past front image, and store the past left side image without storing the past right side image. When the vehicle moves backward while making a right turn, and the turning radius of the vehicle is equal to or more than the prescribed radius, the vehicle periphery monitoring device may be configured to store the past rear image without storing the past front image, and be configured not to store both the past left side image and the past right side image. This makes it possible to reduce the amount of images to be stored.

In this case, when the vehicle moves backward while making a left turn, and the turning radius is smaller than the prescribed radius, the vehicle periphery monitoring device according to the present disclosure may be configured to generate the underfloor image using the past rear image and the past right side image. When the vehicle moves backward while making a left turn, and the turning radius is equal to or more than the prescribed radius, the vehicle periphery monitoring device may be configured to generate the underfloor image using only the past rear image. When the vehicle moves backward while making a right turn, and the turning radius is smaller than the prescribed radius, the vehicle periphery monitoring device may be configured to generate the underfloor image using the past rear image and the past left side image. When the vehicle moves backward while making a right turn, and the turning radius is equal to or more than the prescribed radius, the vehicle periphery monitoring device may be configured to generate the underfloor image using only the past rear image.

The prescribed radius may be set to, for example, a minimum value of the turning radius that allows generation of the underfloor image without using the past left side image and the past right side image, when the vehicle travels while making a turn.

The vehicle periphery monitoring device according to the present disclosure may be configured to store, among the images photographed with the front camera, the rear camera, the left side camera, and the right side camera, the images included in a range that covers a range where the vehicle is movable during a time interval of generating the underfloor image, as the past front image, the past rear image, the past left side image, and the past right side image. This makes it possible to reduce the amount of images to be stored.

In this case, the vehicle periphery monitoring device may be configured to delete the past front image, the past rear image, the past left side image, the past right side image, and the past underfloor image that are stored at a time when the underfloor image is generated. This makes it possible to reduce the amount of images to be stored.

The component members of the present disclosure are not limited to those in the embodiment of the present disclosure described later with reference to drawings. Other objects, other characteristics, and accompanying advantages of the present disclosure shall easily be understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
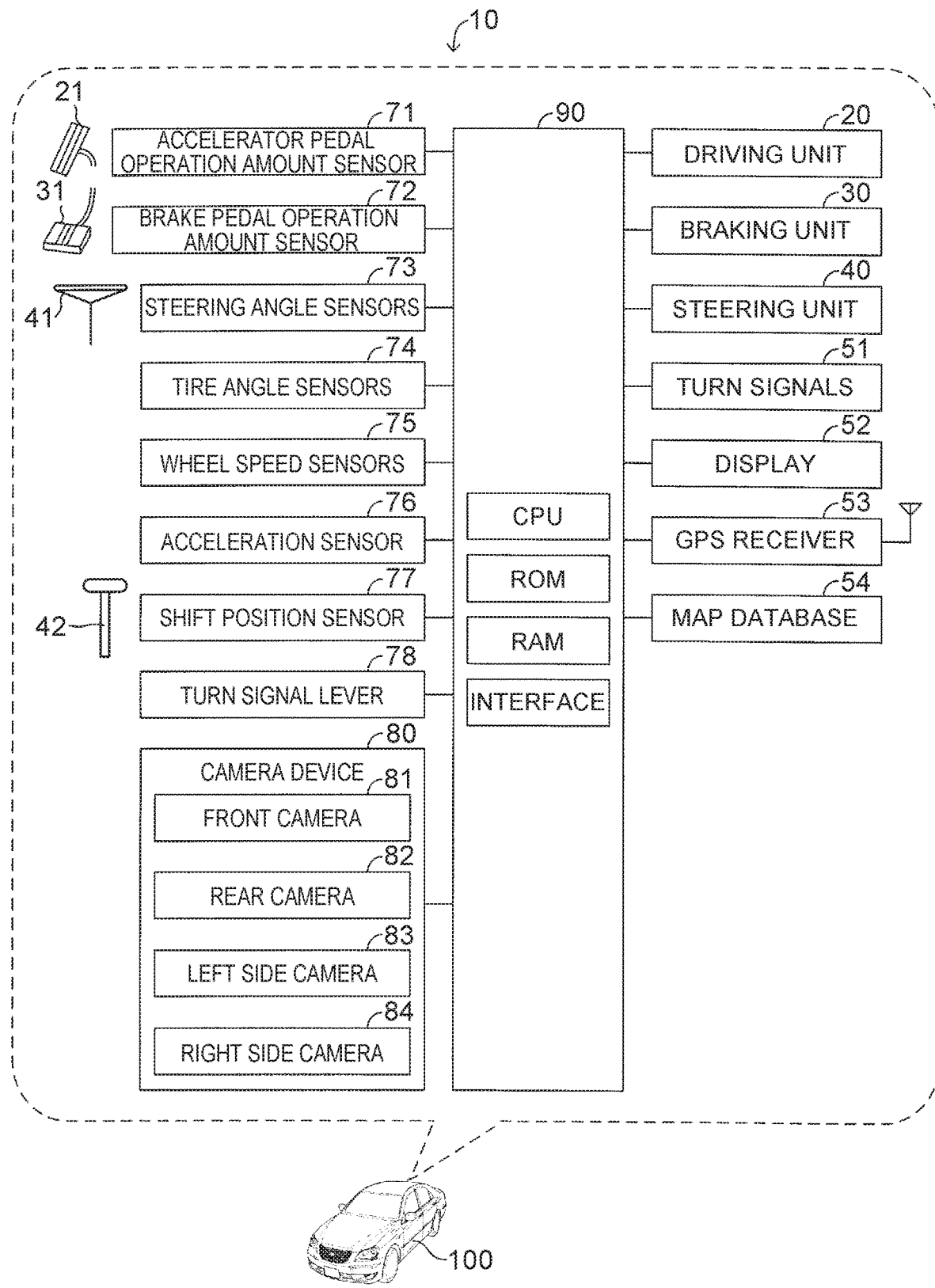
FIG. 1 shows a vehicle periphery monitoring device according to an embodiment of the present disclosure and a vehicle to which the vehicle periphery monitoring device is applied.

Hereinbelow, a vehicle periphery monitoring device according to an embodiment of the present disclosure will be described with reference to the accompanying drawings. As shown in FIG. 1, a vehicle periphery monitoring device 10 according to the embodiment of the present disclosure is mounted in the vehicle 100.

The vehicle 100 includes four wheels including a left front wheel, a right front wheel, a left rear wheel, and a right rear wheel. In the present embodiment, the left front wheel and the right front wheel are steering wheels that are also driving wheels.

The vehicle 100 is also equipped with a driving unit 20, a braking unit 30, and a steering unit 40. The driving unit 20 generates torque (hereinafter "vehicle driving torque") applied to the driving wheels (i.e., the left front wheel and the right front wheel) of the vehicle 100 in order to make the vehicle 100 travel. In the present embodiment, the driving unit 20 is an internal combustion engine. However, the driving unit 20 may be a motor, or may be an internal combustion engine and a motor. The braking unit 30 generates braking force applied to each of the wheels (i.e., the left front wheel, the right front wheel, the left rear wheel, and the right rear wheel) of the vehicle 100 in order to brake the vehicle 100. The steering unit 40 generates steering torque for causing the vehicle 100 to make a left turn or a right turn. The left turn is a turn to the left, and the right turn is a turn to the right.

The vehicle 100 is further equipped with a control device that controls the operating state of the driving unit 20, the braking unit 30, and steering unit 40 or the like. The control device includes an ECU 90. The ECU 90 includes a CPU, a ROM, a RAM, and an interface. The vehicle periphery monitoring device 10 includes the ECU 90 as its component member.

As shown in FIG. 1, the driving unit 20, the braking unit 30, and the steering unit 40 are electrically connected to the ECU 90. The ECU 90 can control vehicle driving torque generated by the driving unit 20 by controlling the operating state of the driving unit 20. The ECU 90 can also control braking force generated by the braking unit 30 by controlling the operating state of the braking unit 30. The ECU 90 can also steer the vehicle 100 by controlling the operating state of the steering unit 40.

The vehicle 100 is further equipped with turn signals 51, a display 52, a GPS receiver 53, and a map database 54. The turn signals 51, the display 52, the GPS receiver 53, and the map database 54 are electrically connected to the ECU 90.

The turn signals 51 are provided at corner portions on a front left side, a front right side, a rear left side, and a rear right side of the vehicle 100. The turn signals 51 blink in response to various kinds of command signals transmitted from the ECU 90.

The display 52 is provided at a position in the vehicle 100 where a driver of the vehicle 100 can visually recognize and operate the display 52. The display 52 displays an image corresponding to various kinds of command signals transmitted from the ECU 90. The display 52 is also a touch panel. By performing touch operation on the display 52 with a finger or the like, the driver can set a destination, and request the ECU 90 to provide a route guidance from a current location of the vehicle 100 to the destination, for example.

The GPS receiver 53 receives GPS signals and transmits the received GPS signals to the ECU 90. The map database 54 stores map information. The ECU 90 can acquire the current location of the vehicle 100 based on the GPS signals, and display on the display 52 a map image around the vehicle 100 by referring to the map information stored in the map database 54. The ECU 90 can also display the current location of the vehicle 100 on the display 52.

Furthermore, when the driver performs touch operation on the display 52 to request route guidance from the current location of the vehicle 100 to the destination, the ECU 90 searches for a route to the destination based on "(1) map information stored in the map database 54, (2) current location of the vehicle 100 acquired based on the GPS signals, and (3) destination set by the driver by touch operation on the display 52". The ECU 90 displays the searched route on the display 52, and outputs voice that guides the route through a speaker (illustration omitted) of the vehicle 100.

The vehicle 100 is further equipped with an accelerator pedal operation amount sensor 71, a brake pedal operation amount sensor 72, a steering angle sensor 73, tire angle sensors 74, wheel speed sensors 75, an acceleration sensor 76, a shift position sensor 77, a turn signal lever 78, and a camera device 80. The accelerator pedal operation amount sensor 71, the brake pedal operation amount sensor 72, the steering angle sensor 73, the wheel speed sensors 75, the acceleration sensor 76, the shift position sensor 77, the tire angle sensors 74, the turn signal lever 78, and the camera device 80 are electrically connected to the ECU 90.

The accelerator pedal operation amount sensor 71 detects an operation amount of the accelerator pedal 21 of the vehicle 100, and transmits a signal indicating the detected operation amount to the ECU 90. Based on the signal, the ECU 90 acquires the operation amount of the accelerator pedal 21 as an accelerator pedal operation amount AP, and controls the operating state of the driving unit 20 based on the accelerator pedal operation amount AP.

The brake pedal operation amount sensor 72 detects an operation amount of the brake pedal 31 of the vehicle 100, and transmits a signal indicating the detected operation amount to the ECU 90. Based on the signal, the ECU 90 acquires the operation amount of the brake pedal 31 as a brake pedal operation amount BP, and controls the operating state of the braking unit 30 based on the brake pedal operation amount BP.

The steering angle sensor 73 detects an angle of the steering wheel 41 of the vehicle 100 rotated by the driver with respect to a neutral position, and transmits a signal indicating the detected angle to the ECU 90. Based on the signal, the ECU 90 acquires the angle of the steering wheel 41 of the vehicle 100 rotated by the driver with respect to the neutral position as a steering angle SA, and controls the operating state of the steering unit 40 based on the acquired steering angle SA. In the present embodiment, the steering angle SA acquired when the steering wheel 41 is rotated counterclockwise from the neutral position takes a positive value, and the steering angle SA acquired when the steering wheel 41 is rotated clockwise from the neutral position takes a negative value.

The tire angle sensors 74 each detect at least the angle of one of the left front wheel and the right front wheel of the vehicle 100 in a front-rear direction of the vehicle 100, and each transmit a signal indicating the detected angle to the ECU 90. Based on each of the signals, the ECU 90 acquires at least the angles of the left front wheel and the right front wheel of the vehicle 100 in the front-rear direction of the vehicle 100 as tire angles TA, respectively.

The wheel speed sensors 75 transmit pulse signals to the ECU 90, whenever the wheels (i.e., the left front wheel, the right front wheel, the left rear wheel, and the right rear wheel) of the vehicle 100 rotate a predetermined angle. The ECU 90 acquires rotation speeds of the wheels based on the pulse signals. The ECU 90 further acquires a traveling speed of the vehicle 100 as a vehicle speed SPD based on the acquired rotation speeds.

The acceleration sensor 76 detects an acceleration Gx in the front-rear direction of the vehicle 100, and transmits a signal indicating the detected acceleration Gx to the ECU 90. Based on the signal, the ECU 90 acquires the acceleration Gx in the front-rear direction of the vehicle 100 as a longitudinal acceleration Gx.

The shift position sensor 77 detects a set position of the shift lever 42, and transmits a signal indicating the detected set position to the ECU 90. Based on the signal, the ECU 90 acquires the set position of the shift lever 42. The shift lever 42 is configured to be settable to any one of a drive position, a reverse position, a neutral position, and a parking position. The drive position is a position for transmitting driving torque from the driving unit 20 to the driving wheels of the vehicle 100 to move the vehicle 100 forward. The reverse position is a position for transmitting the driving torque from the driving unit to the driving wheels of the vehicle 100 to move the vehicle 100 backward. The neutral position is a position for blocking transmission of the driving torque from the driving unit 20 to the driving wheels of the vehicle 100. The parking position is a position for blocking transmission of the driving torque from the driving unit 20 to the driving wheels of the vehicle 100 and maintaining the vehicle 100 in a stopped state.

The turn signal lever 78 is a lever operated by the driver of the vehicle 100. When the driver operates the turn signal lever 78 counterclockwise, the turn signal lever 78 transmits a signal indicating that the driver has operated the turn signal lever 78 counterclockwise to the ECU 90. Upon reception of the signal, the ECU 90 blinks the turn signals 51 provided at the front left corner and the rear left corner, respectively. When the driver operates the turn signal lever 78 clockwise, the turn signal lever 78 transmits a signal indicating that the driver has operated the turn signal lever 78 clockwise to the ECU 90. Upon reception of the signal, the ECU 90 blinks the turn signals 51 provided at the front right corner and the rear right corner, respectively.

Figure 2:
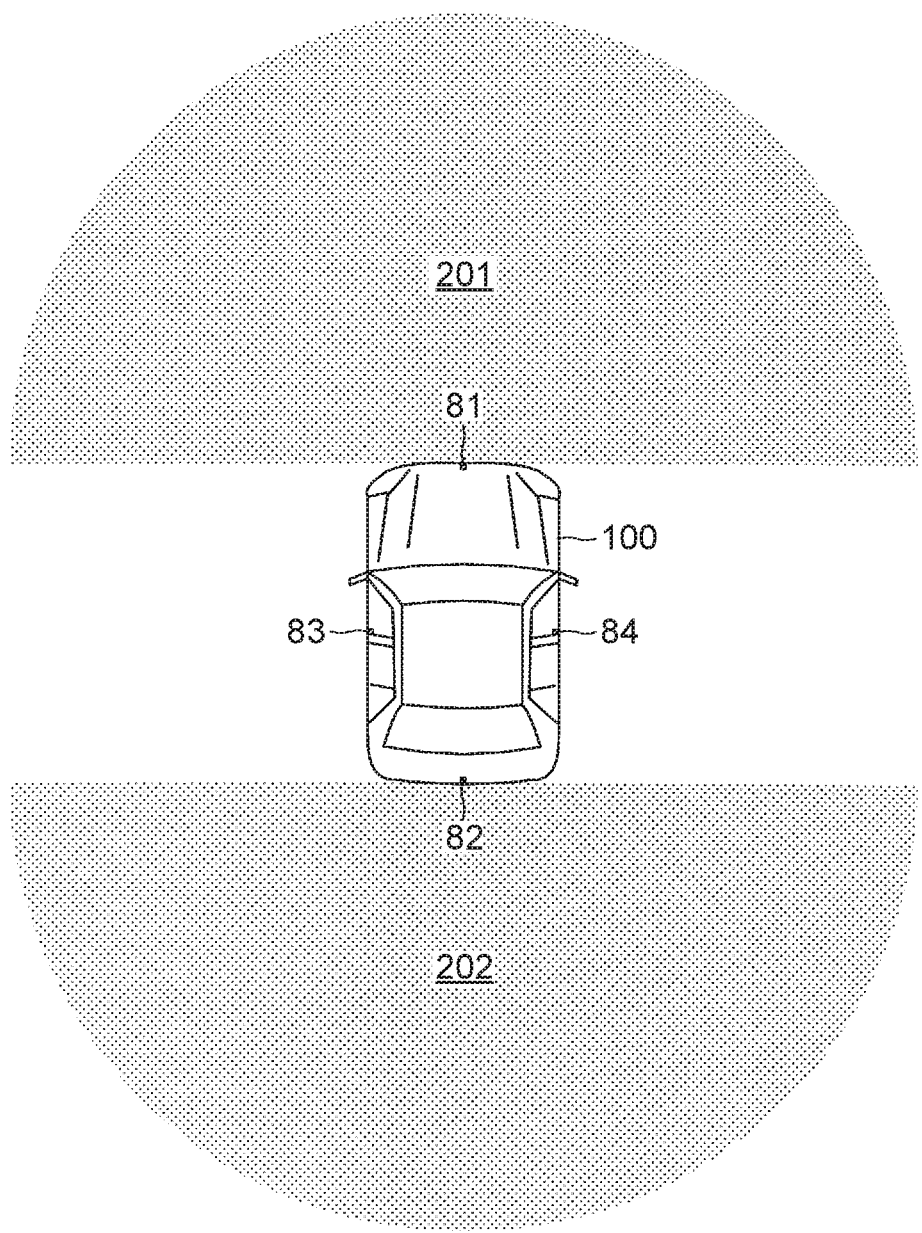
FIG. 2 shows photographing ranges of a front camera and a rear camera.
Figure 3:
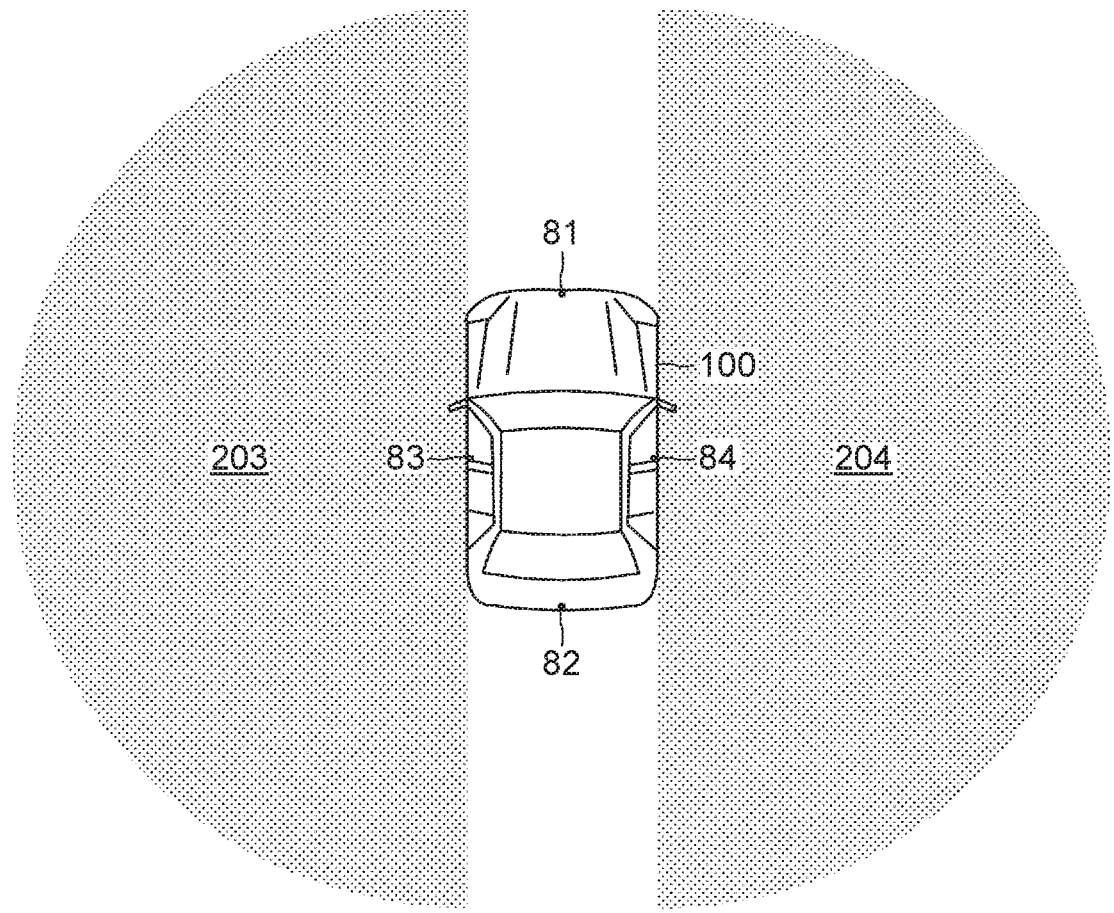
FIG. 3 shows photographing ranges of a left side camera and a right side camera.

The camera device 80 includes a front camera 81, a rear camera 82, a left side camera 83, and a right side camera 84. As shown in FIG. 2, the front camera 81 is attached to the vehicle 100 so as to be able to photograph a prescribed range 201 in front of the vehicle 100. The rear camera 82 is attached to the vehicle 100 so as to be able to photograph a prescribed range 202 behind the vehicle 100. As shown in FIG. 3, the left side camera 83 is attached to the vehicle 100 so as to be able to photograph a prescribed range 203 on the left side of the vehicle 100. The right side camera 84 is attached to the vehicle 100 so as to be able to photograph a prescribed range 204 on the right side of the vehicle 100.

A left side region of the prescribed range 201 that is photographed by the front camera 81 partially overlaps with a front region of the prescribed range 203 photographed by the left side camera 83. A right side region of the prescribed range 201 that is photographed by the front camera 81 partially overlaps with a front region of the prescribed range 204 that is photographed by the right side camera 84. A left side region of the prescribed range 202 that is photographed by the rear camera 82 partially overlaps with a rear region of the prescribed range 203 that is photographed by the left side camera 83. A right side region of the prescribed range 202 that is photographed by the rear camera 82 partially overlaps with a rear region of the prescribed range 204 that is photographed by the right side camera 84.

The camera device 80 transmits front image data D1, rear image data D2, left side image data D3, and right side image data D4 to the ECU 90. The front image data D1 is data on an image photographed by the front camera 81. The rear image data D2 is data on an image photographed with the rear camera 82. The left side image data D3 is data on an image photographed with the left side camera 83. The right side image data D4 is data on an image photographed with the right side camera 84. Hereinafter, the front image data D1, the rear image data D2, the left side image data D3, and the right side image data D4 are collectively called "camera image data DO".

Outline of Operation

Description is now given of the outline of operation of the vehicle periphery monitoring device 10.

Storage of Image Data

Figure 4:
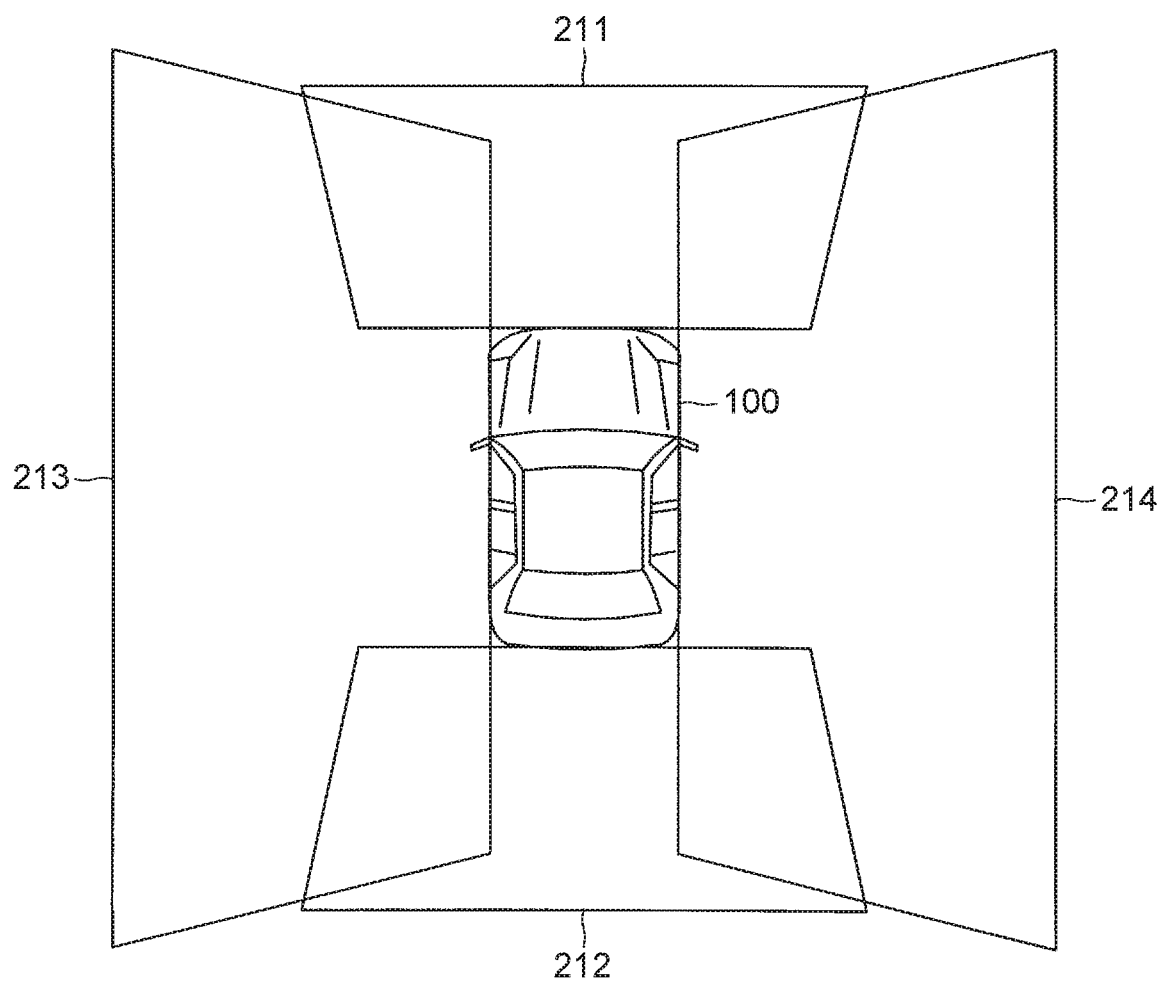
FIG. 4 shows ranges stored as image data.

The vehicle periphery monitoring device 10 is configured such that when a circumferential image i0 and an underfloor image i5 are generated as described later, the vehicle periphery monitoring device 10 stores data on an image corresponding to the prescribed range 211 (see FIG. 4) in front of the vehicle 100 (hereinafter "latest front image data D11($n$)"), included in the front image data D1 used for generation of the circumferential image i0, in a RAM. The vehicle periphery monitoring device 10 is further configured such that when the circumferential image i0 and the underfloor image i5 are generated, the vehicle periphery monitoring device 10 stores data (hereinafter "latest rear image data D12($n$)") on an image corresponding to the prescribed range 212 (see FIG. 4) behind the vehicle 100, included in the rear image data D2 used for generation of the circumferential image i0, in the RAM.

The vehicle periphery monitoring device 10 is further configured such that when the circumferential image i0 and the underfloor image i5 are generated, the vehicle periphery monitoring device 10 stores data (hereinafter "latest left side image data D13($n$)") on an image corresponding to the prescribed range 213 (see FIG. 4) on the left side of the vehicle 100, included in the left side image data D3 used for generation of the circumferential image i0, in the RAM. The vehicle periphery monitoring device 10 is further configured such that when the circumferential image i0 and the underfloor image i5 are generated, the vehicle periphery monitoring device 10 stores data (hereinafter "latest right side image data D14($n$)") on an image corresponding to the prescribed range 214 (see FIG. 4) on the right side of the vehicle 100, included in the right side image data D4 used for generation of the circumferential image i0, in the RAM.

The vehicle periphery monitoring device 10 generates the later-described circumferential image i0 and the underfloor image i5 at a predetermined time interval Ti. The circumferential image i0 is an image displayed on the display 52, the image indicating a peripheral state of the vehicle 100. The underfloor image i5 is an image displayed on the display 52, the image indicating the state of the underfloor of the vehicle 100. The predetermined time interval Ti is hereinafter called "image generation time interval Ti."

Figure 5:
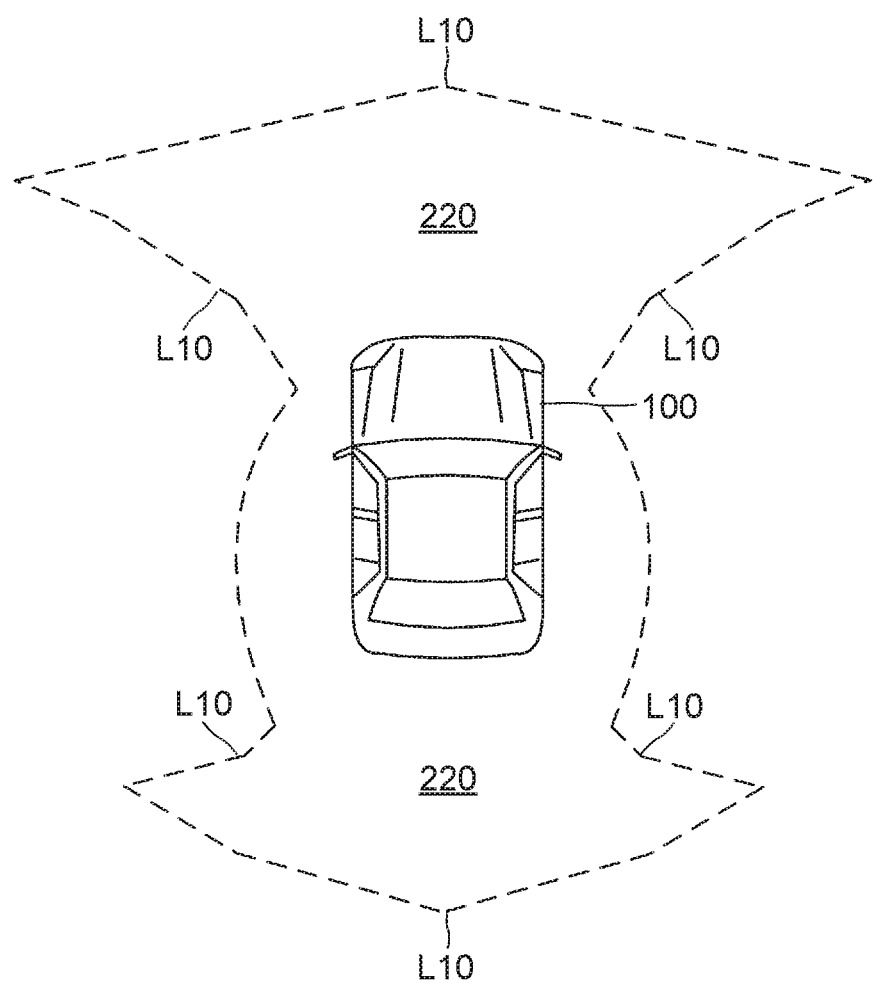
FIG. 5 shows a range where the vehicle is movable in a prescribed time.
Figure 6:
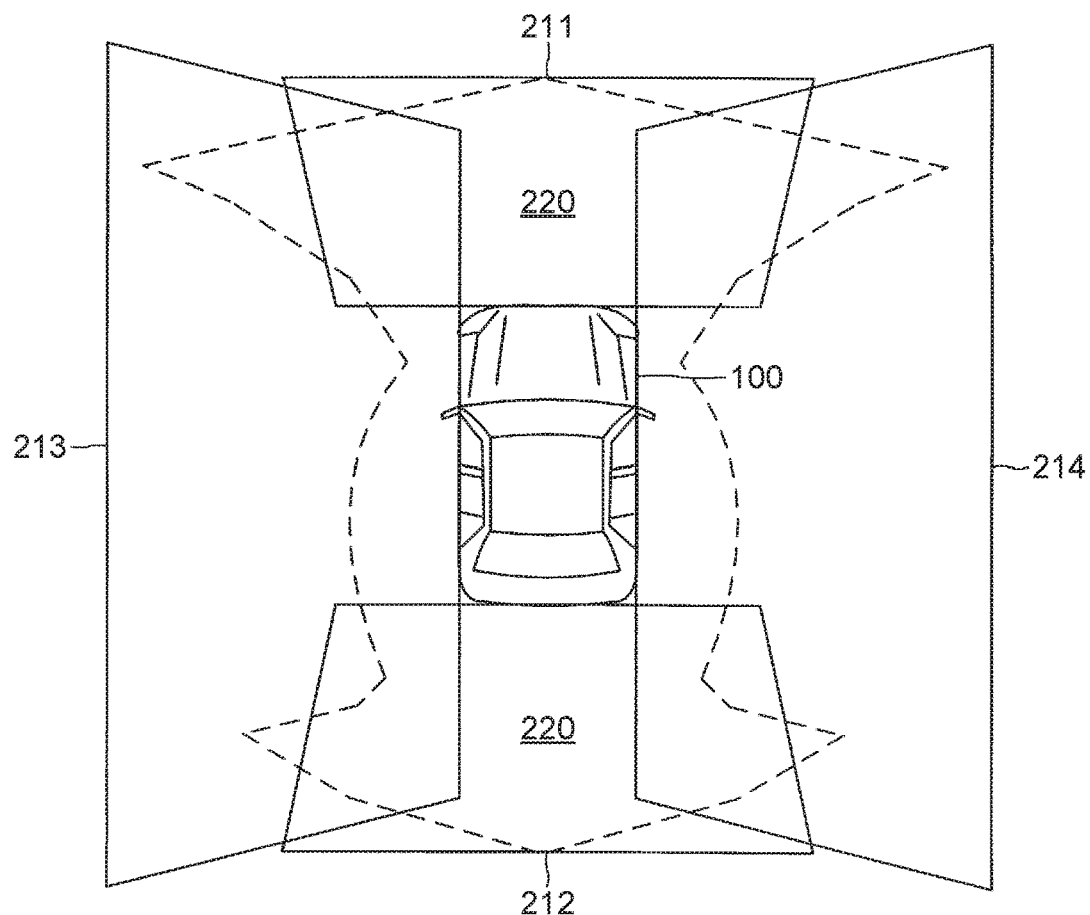
FIG. 6 shows a positional relationship between the ranges stored as image data and the range where the vehicle is movable in the prescribed time.

The prescribed ranges 211 to 214 are set to cover an entire range where the vehicle 100 is movable during the image generation time interval Ti. As shown in FIG. 5, in the present embodiment, a range 220 encircled with a line L10 is set as a range where the vehicle 100 is movable during the image generation time interval Ti when the vehicle 100 moves forward and as a range where the vehicle 100 is movable during the image generation time interval Ti when the vehicle 100 moves backward. As shown in FIG. 6, the prescribed ranges 211 to 214 are set to cover the entire range 220.

Hereinafter, the latest front image data D11($n$) stored in the RAM is called "past front image data D11($n$−1)". The latest rear image data D12($n$) stored in the RAM is called "past rear image data D12($n$−1)". The latest left side image data D13($n$) stored in the RAM is called "past left side image data D13($n$−1)". The latest right side image data D14($n$) stored in the RAM is called "past right side image data D14($n$−1)".

The past front image data D11($n$−1), the past rear image data D12($n$−1), the past left side image data D13($n$−1), and the past right side image data D14($n$−1) are collectively called "past camera image data D10($n$−1)."

The vehicle periphery monitoring device 10 further configured to store data D5 on the underfloor image i5 generated as described later in the RAM. Hereinafter, the data D5 on the underfloor image i5 stored in the RAM is called "past underfloor image data D15($n$−1)".

In the present embodiment, the prescribed ranges 211 to 214 are set to the ranges minimum required to generate the underfloor image i5 in consideration of the range where the vehicle 100 is movable during the image generation time interval Ti. However, the prescribed ranges 211 to 214 may be set to be wider than those in the present embodiment, respectively.

Generation and Display of Overhead Image

Figure 7:
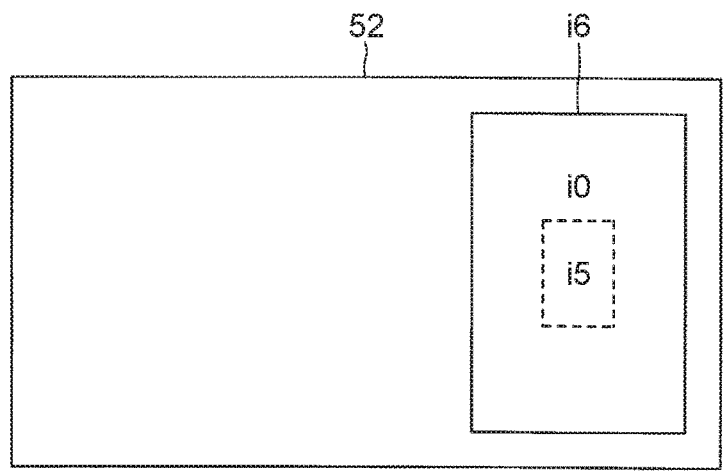
FIG. 7 shows a display displaying a peripheral image and an underfloor image.

As shown in FIG. 7, the vehicle periphery monitoring device 10 is configured to display the circumferential image i0 and the underfloor image i5 on the display 52 in the form of an overhead image i6. As stated before, the circumferential image i0 is an image indicating the peripheral state of the vehicle 100, and the underfloor image i5 is an image indicating the state of the underfloor of the vehicle 100.

The vehicle periphery monitoring device 10 generates the circumferential image i0 based on the camera image data DO (i.e., the front image data D1, the rear image data D2, the left side image data D3, and right side image data D4)

that is latest at the present moment. Meanwhile, the vehicle periphery monitoring device 10 generates the underfloor image i5 as follows.

Specifically, when the vehicle 100 moves straight forward, the vehicle periphery monitoring device 10 generates the underfloor image i5 indicating the state of the underfloor of the vehicle 100 at the present moment by properly using the past front image data D11($n$−1) and the past underfloor image data D15($n$−1).

Figure 8:
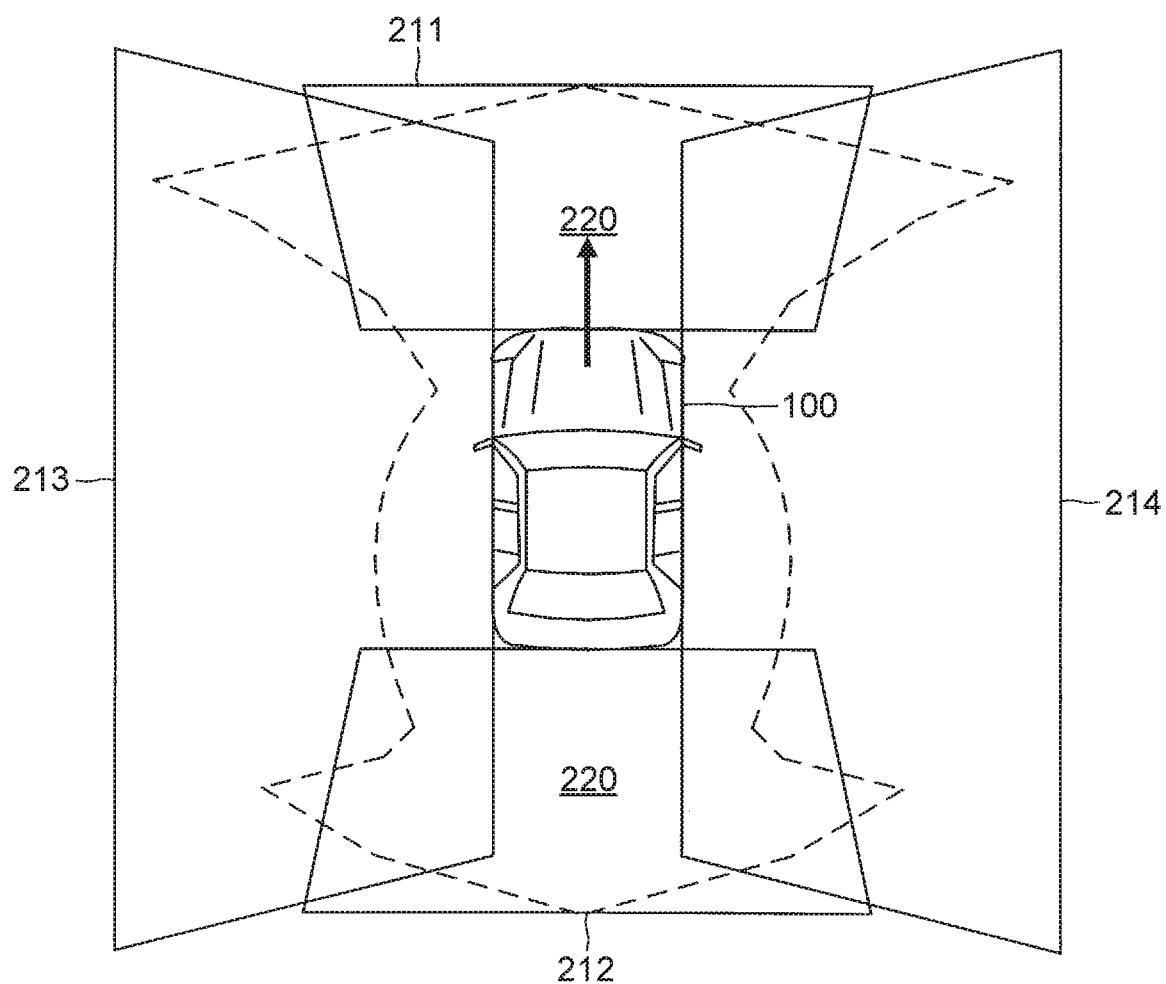
FIG. 8 illustrates operation of the vehicle periphery monitoring device according to the embodiment of the present disclosure.
Figure 9:
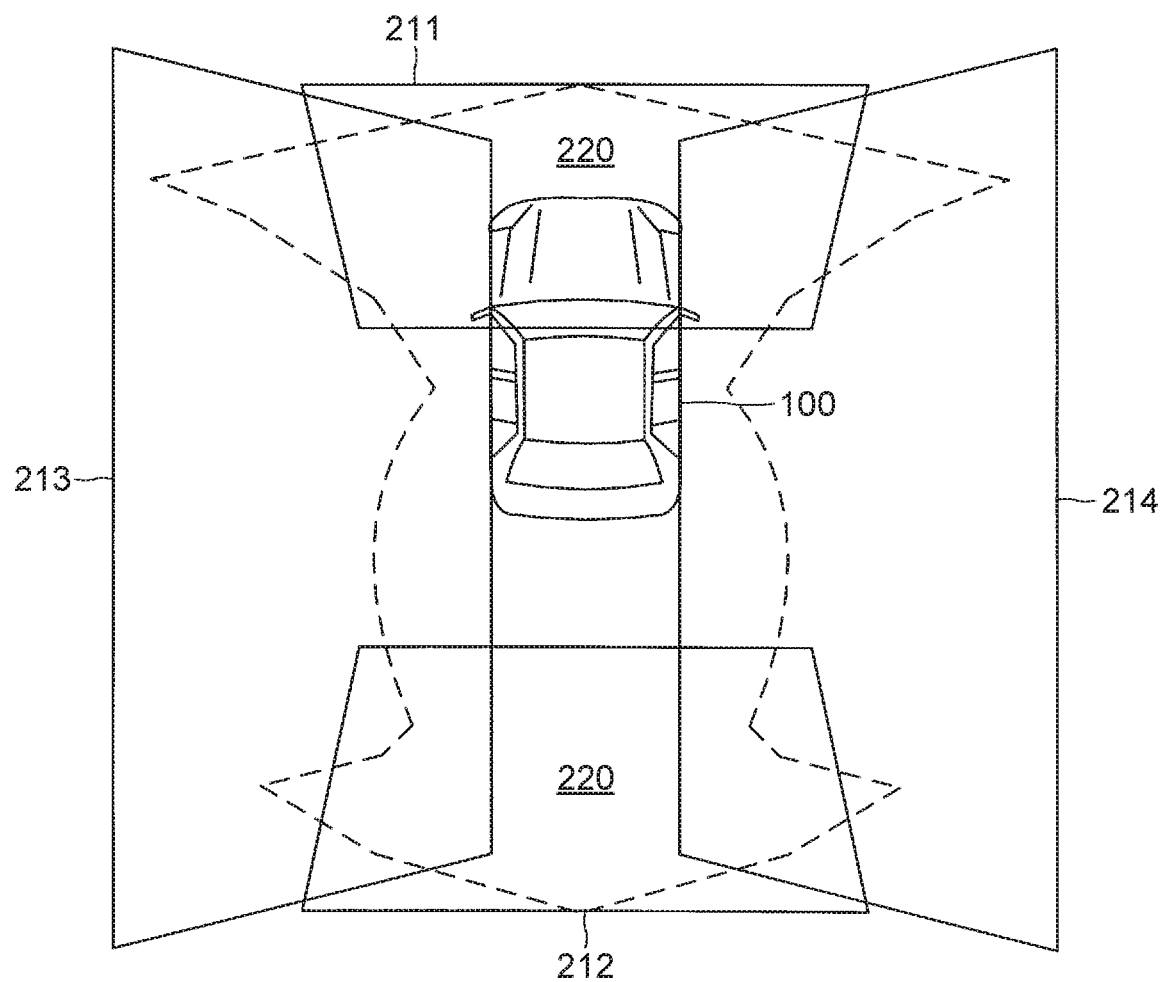
FIG. 9 illustrates operation of the vehicle periphery monitoring device according to the embodiment of the present disclosure.
Figure 10:
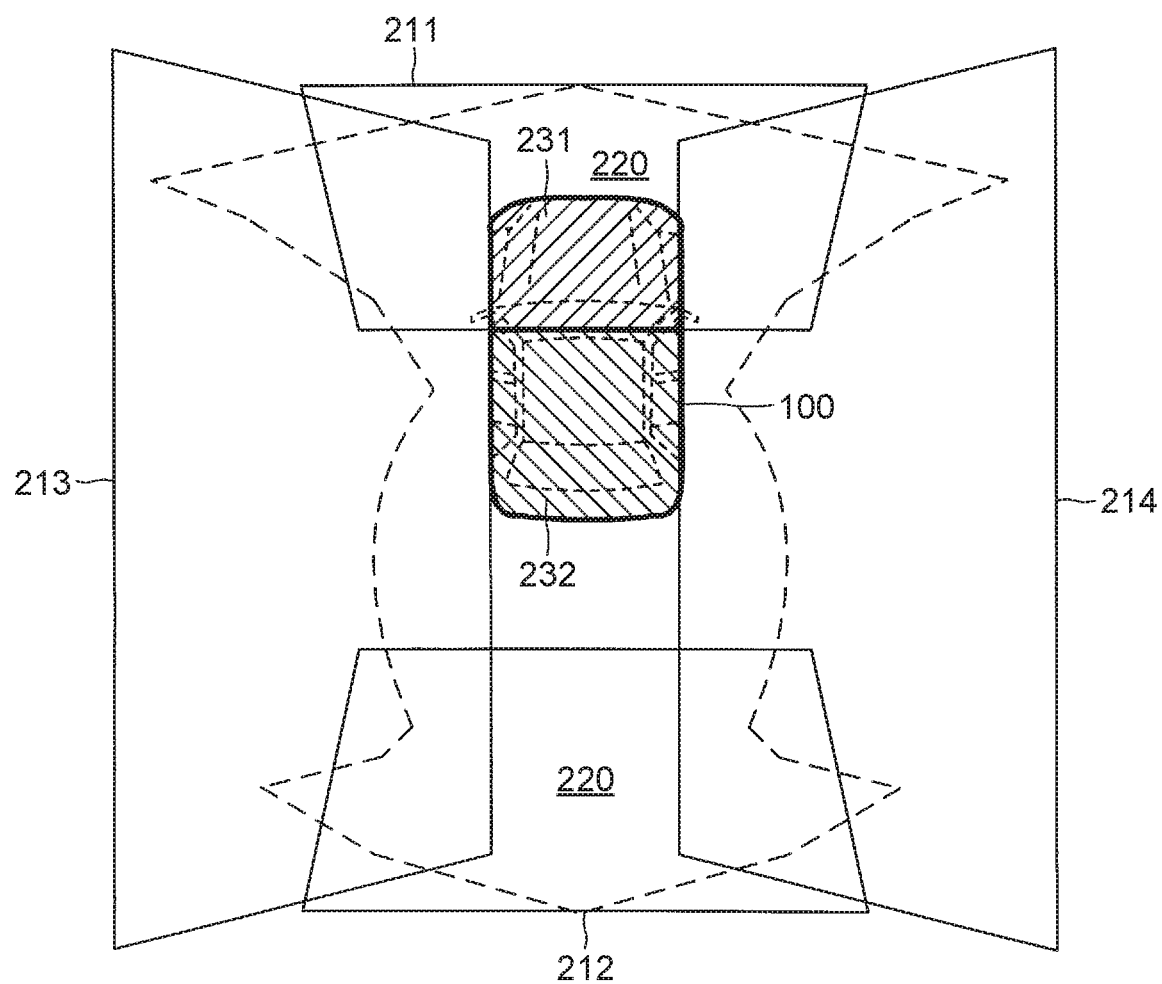
FIG. 10 illustrates operation of the vehicle periphery monitoring device according to the embodiment of the present disclosure.

For example, when the vehicle 100 moves straight forward from a position shown in FIG. 8 to a position shown in FIG. 9, the vehicle periphery monitoring device 10 generates a portion of the underfloor image i5 corresponding to the range 231 shown in FIG. 10 by using the past front image data D11($n$−1), and generates a portion of the underfloor image i5 corresponding to the range 232 shown in FIG. 10 by using the past underfloor image data D15($n$−1). The vehicle periphery monitoring device 10 then combines these generated portions into the underfloor image i5.

When the vehicle 100 moves straight backward, the vehicle periphery monitoring device 10 also similarly generates the underfloor image i5 indicating the state of the underfloor of the vehicle 100 at the present moment by properly using the past rear image data D12($n$−1) and the past underfloor image data D15($n$−1).

When the vehicle 100 moves forward while making a left turn, the vehicle periphery monitoring device 10 generates the underfloor image i5 indicating the state of the underfloor of the vehicle 100 at the present moment by properly using the past front image data D11($n$−1), the past left side image data D13($n$−1), and the past underfloor image data D15($n$−1).

Figure 11:
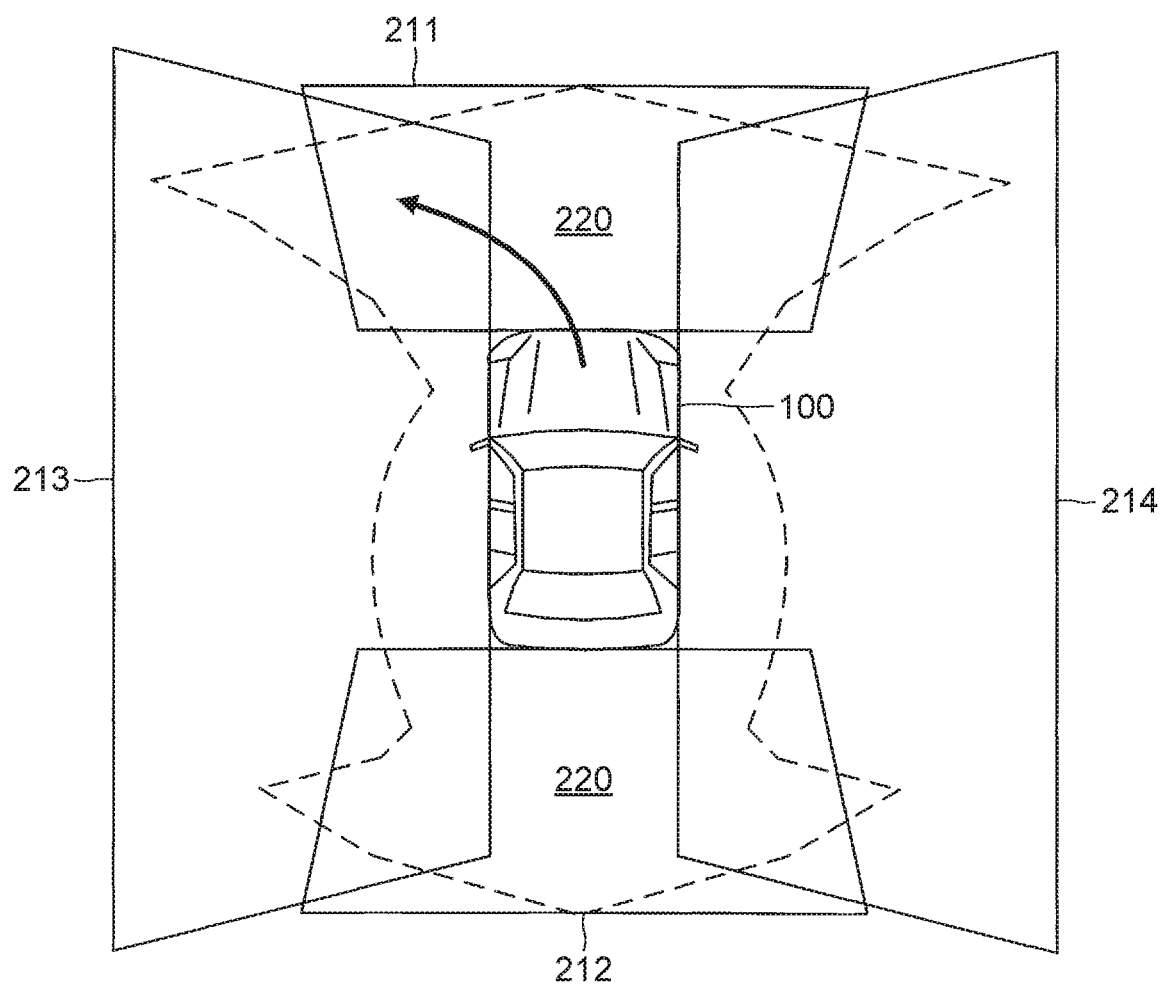
FIG. 11 illustrates operation of the vehicle periphery monitoring device according to the embodiment of the present disclosure.
Figure 12:
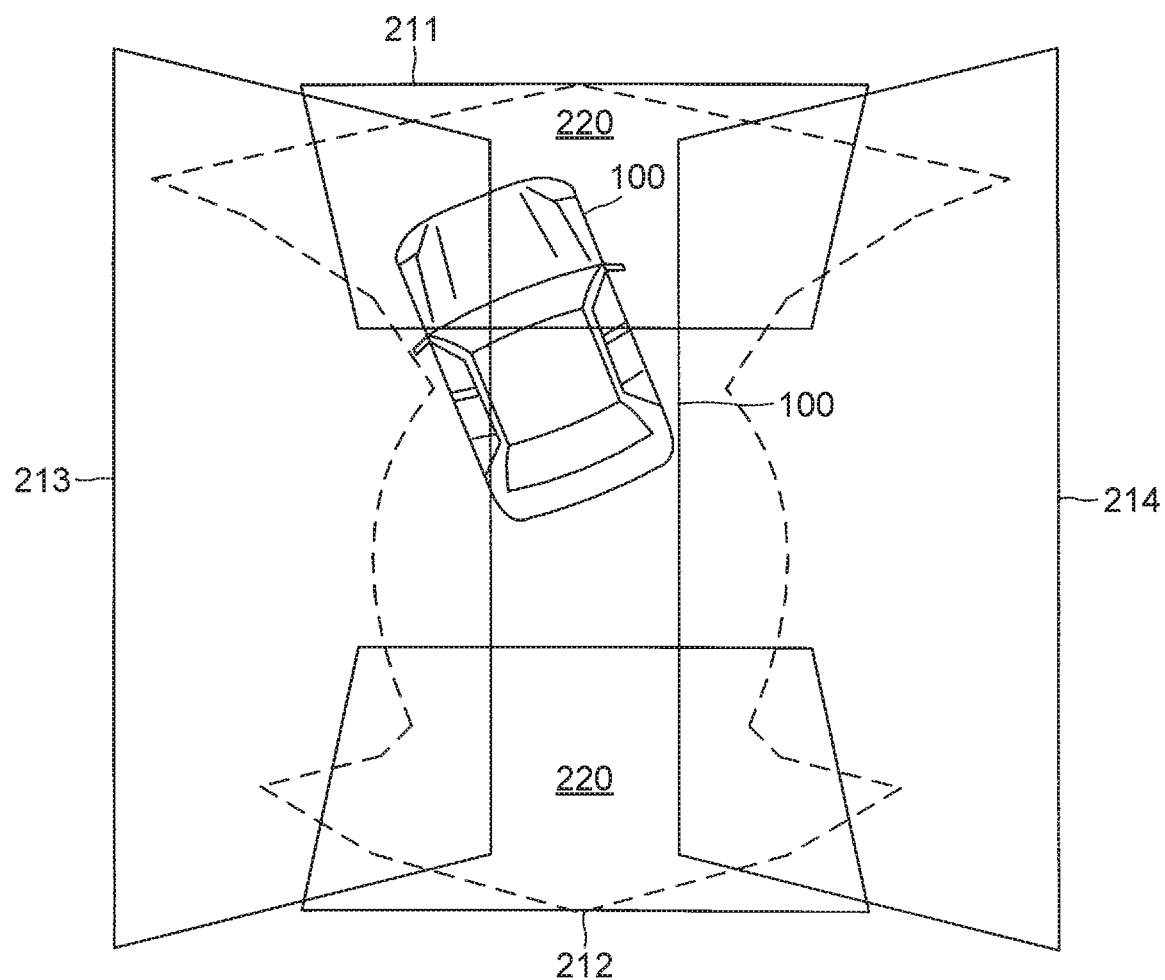
FIG. 12 illustrates operation of the vehicle periphery monitoring device according to the embodiment of the present disclosure.
Figure 13:
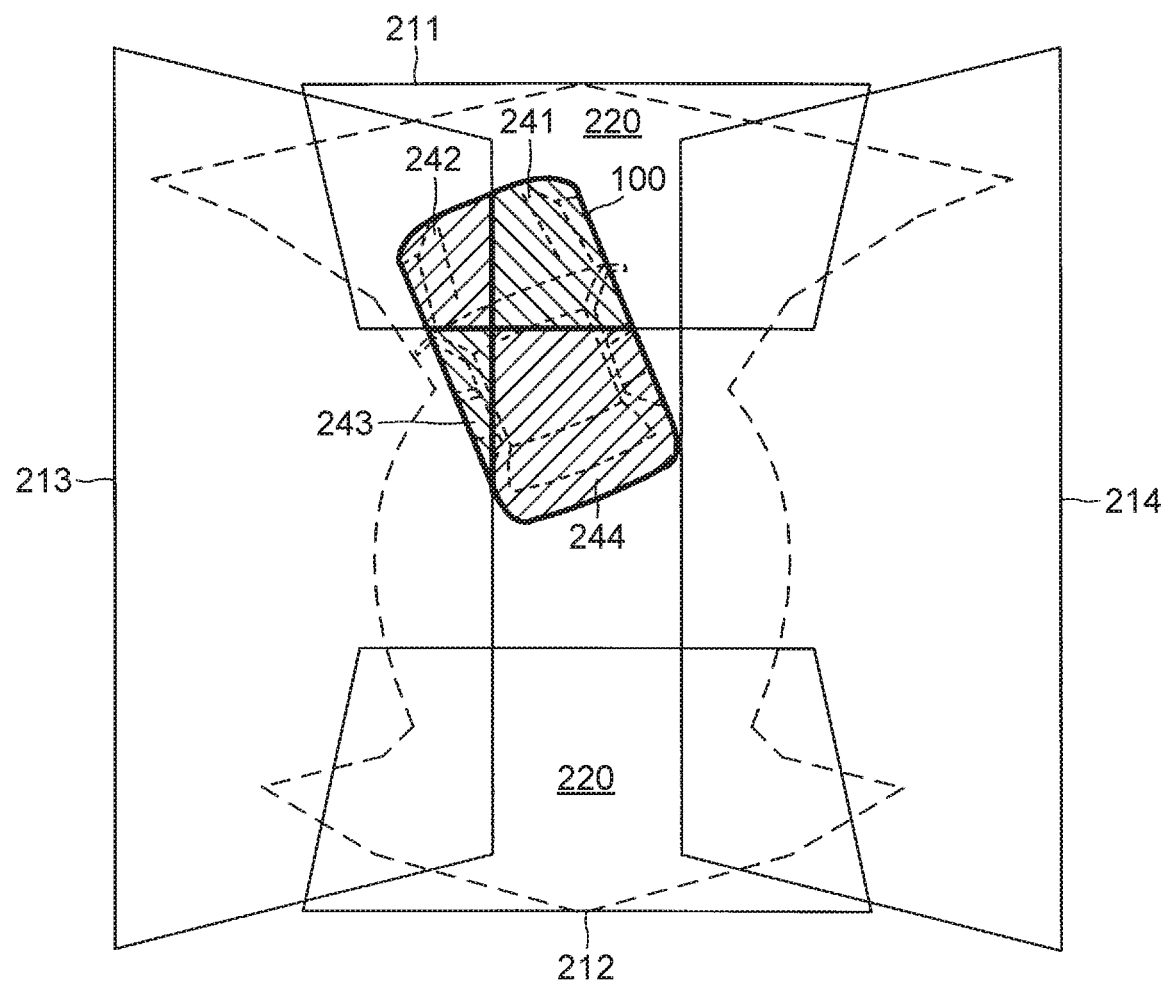
FIG. 13 illustrates operation of the vehicle periphery monitoring device according to the embodiment of the present disclosure.

For example, when the vehicle 100 moves forward while making a left turn from a position shown in FIG. 11 to a position shown in FIG. 12, the vehicle periphery monitoring device 10 generates a portion of the underfloor image i5 corresponding to the range 241 shown in FIG. 13 by using the past front image data D11($n$−1), generates a portion of the underfloor image i5 corresponding to the ranges 242, 243 shown in FIG. 13 by using the past left side image data D13($n$−1), and generates a portion of the underfloor image i5 corresponding to the range 244 shown in FIG. 13 by using the past underfloor image data D15($n$−1). The vehicle periphery monitoring device 10 then combines these portions into the underfloor image i5.

In the present embodiment, the portion of the underfloor image i5 corresponding to the range 242 shown in FIG. 13 is generated by using the past left side image data D13($n$−1). However, the portion of the underfloor image i5 corresponding to the range 242 can also be generated by using the past front image data D11($n$−1). Thus, the portion of the underfloor image i5 that can be generated by using two or more pieces of the past image data may be generated by properly selecting any one piece of the past image data or by blending some pieces of the past image data.

When the vehicle 100 moves forward while making a right turn, as in the case where the vehicle 100 moves forward while making a left turn, the vehicle periphery monitoring device 10 generates the underfloor image i5 indicating the state of the underfloor of the vehicle 100 at the present moment by properly using the past front image data D11($n$−1), the past right side image data D14($n$−1), and the past underfloor image data D15($n$−1).

When the vehicle 100 moves backward while making a left turn, the vehicle periphery monitoring device 10 generates the underfloor image i5 indicating the state of the underfloor of the vehicle 100 at the present moment by properly using the past rear image data D12($n$−1), the past right side image data D14($n$−1), and the past underfloor image data D15($n$−1).

Figure 14:
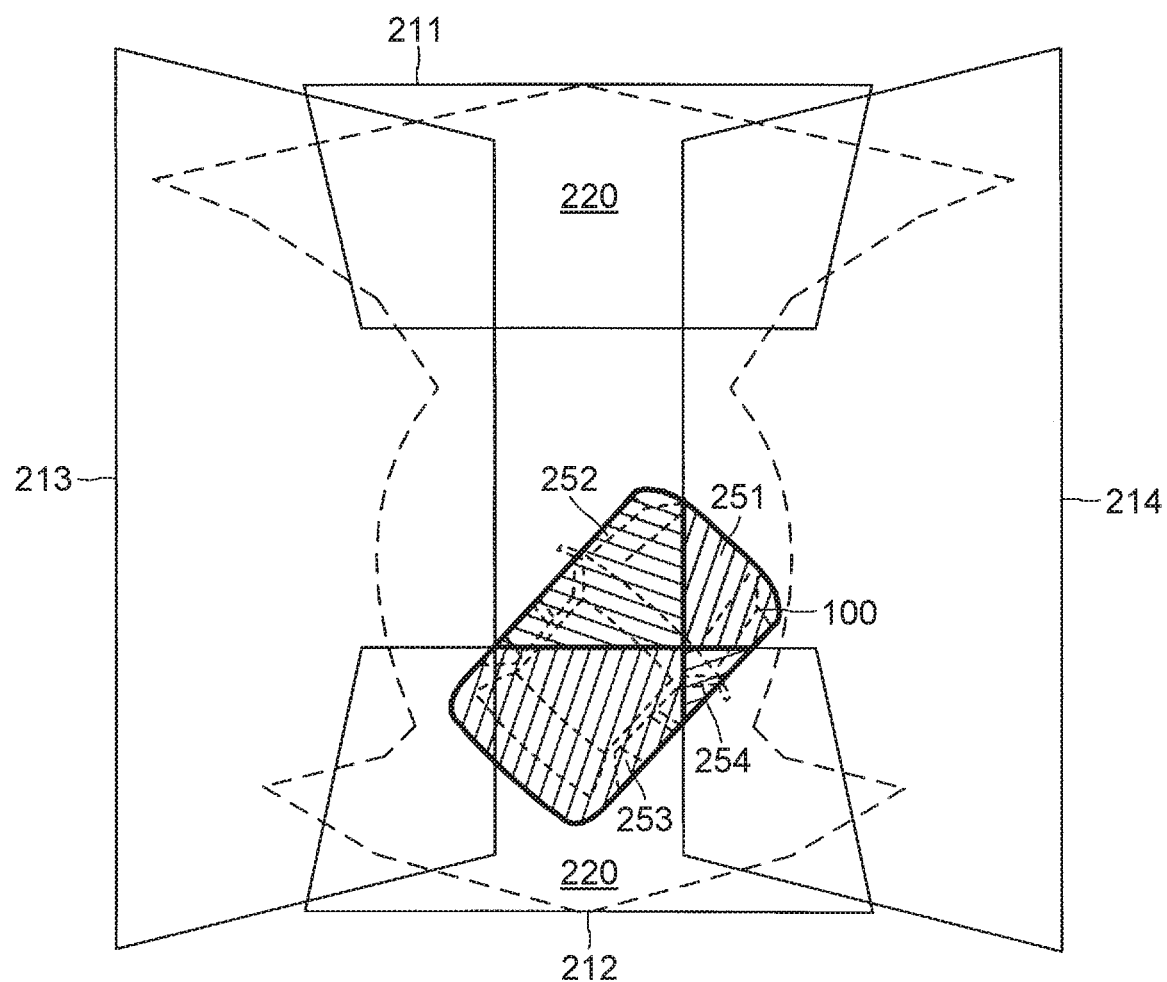
FIG. 14 illustrates operation of the vehicle periphery monitoring device according to the embodiment of the present disclosure.

For example, when the vehicle 100 moves backward while making a left turn from the position shown in FIG. 11 to a position shown in FIG. 14, the vehicle periphery monitoring device 10 generates a portion of the underfloor image i5 corresponding to the range 253 shown in FIG. 14 by using the past rear image data D12($n$−1), generates a portion of the underfloor image i5 corresponding to the ranges 251, 254 shown in FIG. 14 by using the past right side image data D14($n$−1), and generates a portion of the underfloor image i5 corresponding to the range 252 shown in FIG. 14 by using the past underfloor image data D15($n$−1). The vehicle periphery monitoring device 10 then combines these portions into the underfloor image i5.

In the present embodiment, the portion of the underfloor image i5 corresponding to the range 254 shown in FIG. 14 is generated by using the past right side image data D14($n$−1). However, the portion of the underfloor image i5 corresponding to the range 254 can also be generated by using the past rear image data D12($n$−1). Thus, the portion of the underfloor image i5 that can be generated by using two or more pieces of the past image data may be generated by properly selecting any one piece of the past image data or by blending some pieces of the past image data.

When the vehicle 100 moves backward while making a right turn, as in the case where the vehicle 100 moves backward while making a left turn, the vehicle periphery monitoring device 10 generates the underfloor image i5 indicating the state of the underfloor of the vehicle 100 at the present moment by properly using the past rear image data D12($n$−1), the past left side image data D13($n$−1), and the past underfloor image data D15($n$−1).

Then, the vehicle periphery monitoring device 10 displays the generated circumferential image i0 and underfloor image i5 on the display 52 in the form of the overhead image i6. The overhead image i6 is an image when the vehicle 100 is viewed from the top.

Figure 15:
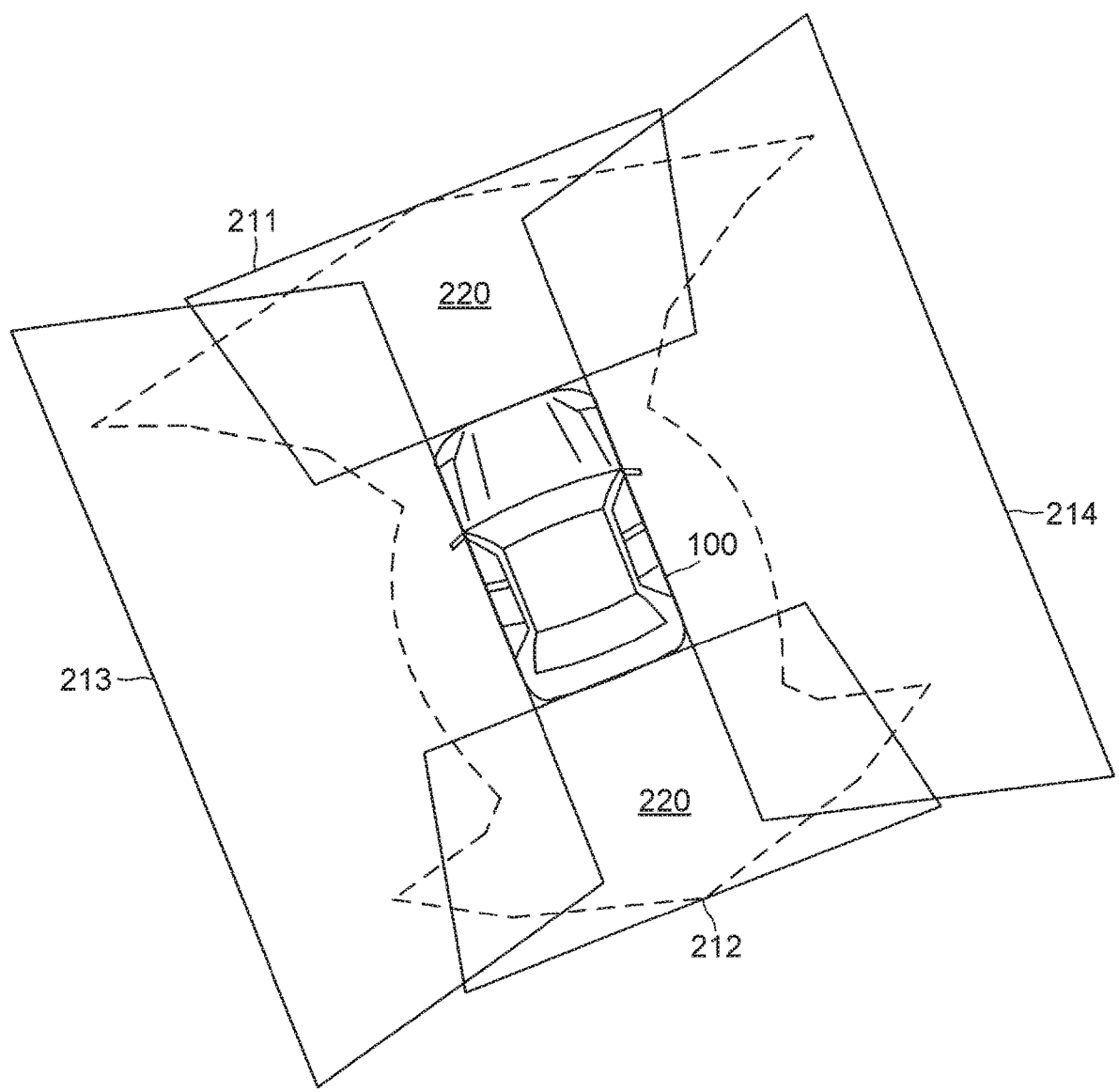
FIG. 15 illustrates operation of the vehicle periphery monitoring device according to the embodiment of the present disclosure.

The vehicle periphery monitoring device 10 is also configured such that when the circumferential image i0 and the underfloor image i5 are generated, the vehicle periphery monitoring device 10 extracts, from the latest camera image data DO, data corresponding to the prescribed ranges 211 to 214 (see FIG. 15) based on the vehicle 100 at the present moment (i.e., latest front image data D11($n$), latest rear image data D12($n$), latest left side image data D13($n$), and latest right side image data D14($n$)), and stores these data in the RAM as the new past camera image data D10($n$−1) (i.e., the past front image data D11($n$−1), the past rear image data D12($n$−1), the past left side image data D13($n$−1), and past right side image data D14($n$−1)).

Hereinafter, the latest front image data D11($n$), the latest rear image data D12($n$), the latest left side image data D13($n$), and the latest right side image data D14($n$) are collectively called "latest camera image data D10($n$)."

When the vehicle 100 moves forward while making a turn, the vehicle periphery monitoring device 10 generates the underfloor image i5 by using the past front image data D11($n$−1) as well as the past left side image data D13($n$−1) or the past right side image data D14($n$−1). Therefore, the vehicle periphery monitoring device 10 can correctly display the state of the underfloor of the vehicle 100 on the display 52, even when the vehicle 100 moves forward while making a turn.

When the vehicle 100 moves backward while making a turn, the vehicle periphery monitoring device 10 generates the underfloor image i5 by using the past rear image data D12(n−1), as well as the past left side image data D13(n−1) or the past right side image data D14(n−1). Therefore, the vehicle periphery monitoring device 10 can correctly display the state of the underfloor of the vehicle 100 on the display 52, even when the vehicle 100 moves backward while making a turn.

When generating the underfloor image i5, the vehicle periphery monitoring device 10 acquires a relative positional relationship between "the vehicle 100 at the time when the past camera image data D10(n−1) and the past underfloor image data D15(n−1) were previously stored in the RAM" and "the vehicle 100 at the present moment". Then, based on the acquired relative positional relationship, the vehicle periphery monitoring device 10 determines which portion of an image that can be generated by using the past camera image data D10(n−1) and the past underfloor image data D15(n−1) stored in the RAM is to be used as the underfloor image i5.

Assume the case where the vehicle 100 stops for a relatively long time. In this case, while the vehicle 100 stops, the vehicle periphery monitoring device 10 ends up continuously displaying the same underfloor image i5 on the display 52. However, while the vehicle 100 stops, the condition of the underfloor of the vehicle 100 may change due to an animal or the like going below the underfloor of the vehicle 100. Thus, when the condition of the underfloor of the vehicle 100 has a change, it is undesirable to continuously display on the display 52 the underfloor image i5 indicating the condition of the underfloor of the vehicle 100 before the change.

Accordingly, the vehicle periphery monitoring device 10 may be configured not to display the underfloor image i5 on the display 52 by deleting the underfloor image i5 from the display 52, when a traveling distance of the vehicle 100 for fixed time is equal to or less than a constant distance.

Alternatively, when an animal or the like goes below the underfloor of the vehicle 100, the animal or the like is to be photographed by the camera device 80. Therefore, it is possible to know whether the condition of the underfloor of the vehicle 100 has a change based on the camera image data DO output by the camera device 80 while the vehicle 100 stops.

Accordingly, the vehicle periphery monitoring device 10 may be configured to determine whether the condition of the underfloor of the vehicle 100 has a change based on the camera image data DO, when the traveling distance of the vehicle 100 for fixed time is equal to or less than a constant distance. When determining that the condition of the underfloor of the vehicle 100 has a change, the vehicle periphery monitoring device 10 may be configured not to display the underfloor image i5 on the display 52 by deleting the underfloor image i5 from the display 52.

When the latest front image front image data D11(n), the latest rear image data D12(n), the latest left side image data D13(n), and the latest right side image data D14(n) are stored in the RAM as the latest past camera image data D10(n−1), the vehicle periphery monitoring device 10 is configured to delete the past camera image data D10(n−1), stored in the RAM up to then, from the RAM. In addition, when the data D5 on the underfloor image i5 is stored as the new past underfloor image data D15(n−1) in the RAM, the vehicle periphery monitoring device 10 is configured to delete the past underfloor image data D15(n−1), stored up to then in the RAM, from the RAM.

However, when data that may be used for generation of the next underfloor image i5 is present in the past camera image data D10(n−1) already stored in the RAM, the vehicle periphery monitoring device 10 may be configured to keep the data in the RAM without deleting it. Similarly, when data that may be used for generation of the next underfloor image i5 is present in the past underfloor data D15(n−1) already stored in the RAM, the vehicle periphery monitoring device 10 may be configured to keep the data in the RAM without deleting it.

The vehicle periphery monitoring device 10 also determines whether the vehicle 100 moves forward or backward based on at least one of "(1) set position of the shift lever 42, (2) pulse signals output by the wheel speed sensors 75, (3) longitudinal acceleration Gx, (4) change in current location of the vehicle 100 acquired from GPS signals, and (5) current location of the vehicle 100 in a searched route to the destination".

The vehicle periphery monitoring device 10 also determines whether the vehicle 100 makes a left turn or a right turn based on at least one of "(1) steering angle SA, (2) tire angles TA, (3) direction in which the turn signal lever 78 is operated, and (4) current location of the vehicle 100 in the searched route to the destination".

Specific Operation

Description is now given of specific operation of the vehicle periphery monitoring device 10. The CPU of the ECU 90 of the vehicle periphery monitoring device 10 executes a routine shown in FIG. 16 whenever a predetermined time Tcal lapses.

Figure 16:
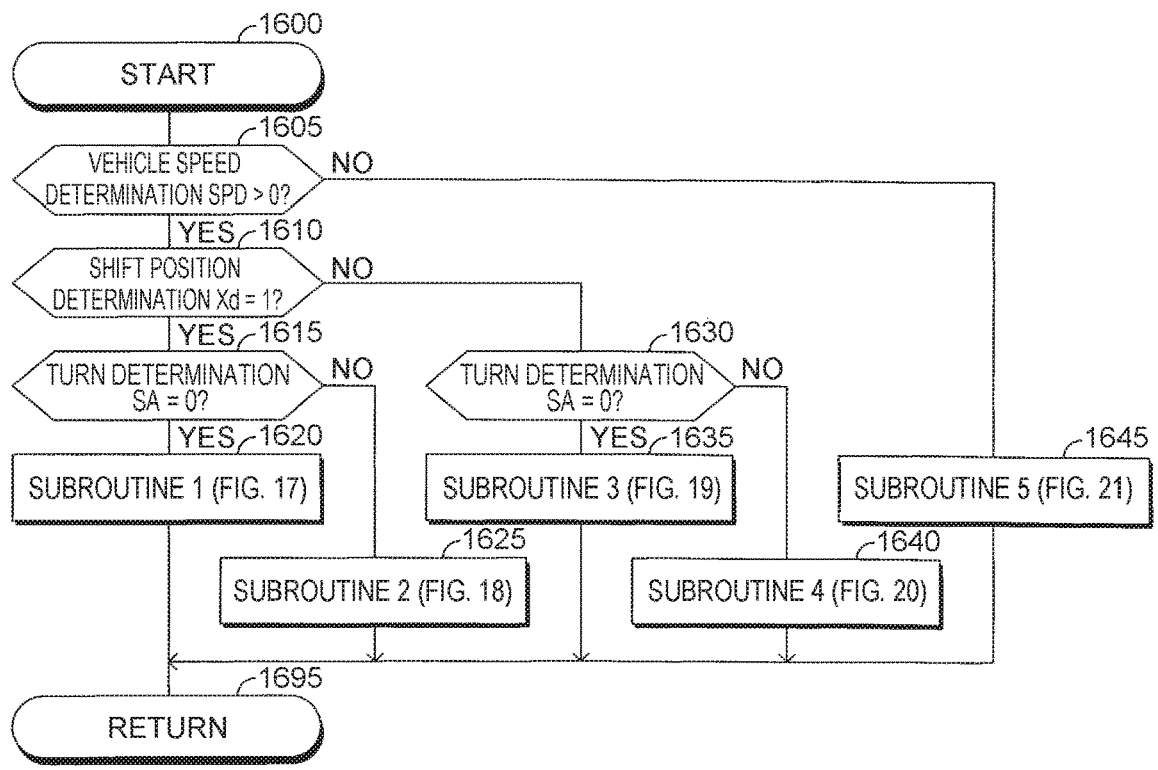
FIG. 16 is a flowchart showing a routine executed by the vehicle periphery monitoring device according to the embodiment of the present disclosure.

Therefore, when predetermined timing has come, the CPU starts the process from step 1600 of FIG. 16. Then, the CPU advances the process to step 1605 to determine whether a vehicle speed SPD is larger than zero (i.e., whether or not the vehicle 100 travels).

When determining "Yes" in step 1605, the CPU advances the process to step 1610 to determine whether or not the value of a drive position flag Xd is "1" (whether or not the vehicle 100 move forward). The value of the drive position flag Xd is set to "1" when the shift lever 42 is set to the drive position, and is set to "0" when the shift lever 42 is set to the positions other than the drive position.

When determining "Yes" in step 1610 (i.e., when the vehicle 100 moves forward), the CPU advances the process to step 1615 to determine whether or not the steering angle SA is zero (i.e., whether or not the vehicle 100 moves straight forward).

Figure 17:
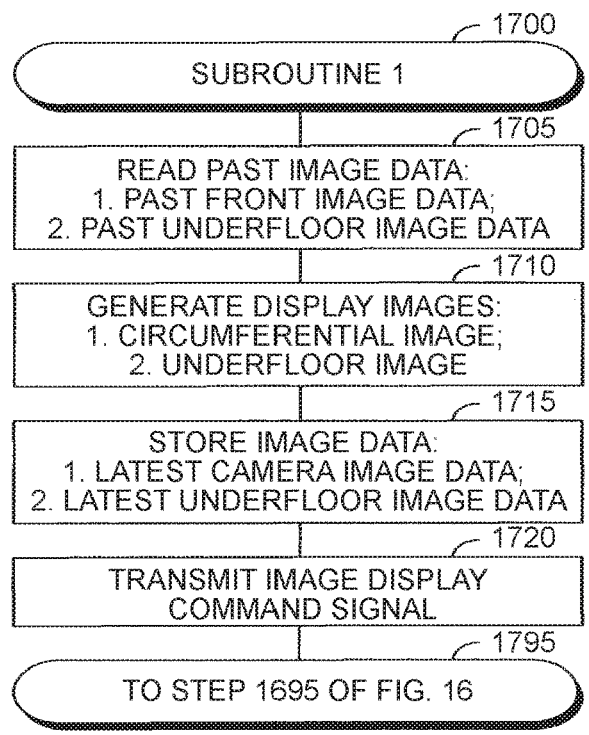
FIG. 17 is a flowchart showing a routine executed by the vehicle periphery monitoring device according to the embodiment of the present disclosure.

When determining "Yes" in step 1615 (i.e., when the vehicle 100 moves straight forward), the CPU advances the process to step 1620 to execute a routine shown in FIG. 17. Therefore, when the CPU advances the process to step 1620, the CPU starts the process from step 1700 of FIG. 17. The CPU advances the process to step 1705 to read the past front image data D11(n−1) and the past underfloor image data D15(n−1) from the RAM.

Next, the CPU advances the process to step 1710 to generate the circumferential image i0 based on the latest camera image data DO. In addition, the CPU generates the underfloor image i5 based on the past front image data D11(n−1) and the past underfloor image data D15(n−1) read in step 1705 as described before.

Next, the CPU advances the process to step 1715 to extract "the latest front image data D11(n), latest rear image data D12(n), the latest left side image data D13(n), and the latest right side image data D14(n)" from the latest camera image data DO and store these extracted data in the RAM as the new "past front image data D11(n−1), past rear image data D12(n−1), past left side image data D13(n−1), and past right side image data D14(n−1)". In addition, the CPU stores the data D5 on the underfloor image i5 generated in step 1710 in the RAM as the new past underfloor image data D15(n−1).

Next, the CPU advances the process to step 1720 to transmit an image display command signal Sd to the display 52. As a result, the circumferential image i0 and underfloor image i5 generated in step 1710 are displayed on the display 52 in the form of an overhead image i6. Then, the CPU advances the process to step 1695 of FIG. 16 through step 1795, and temporarily terminates the present routine.

Figure 18:
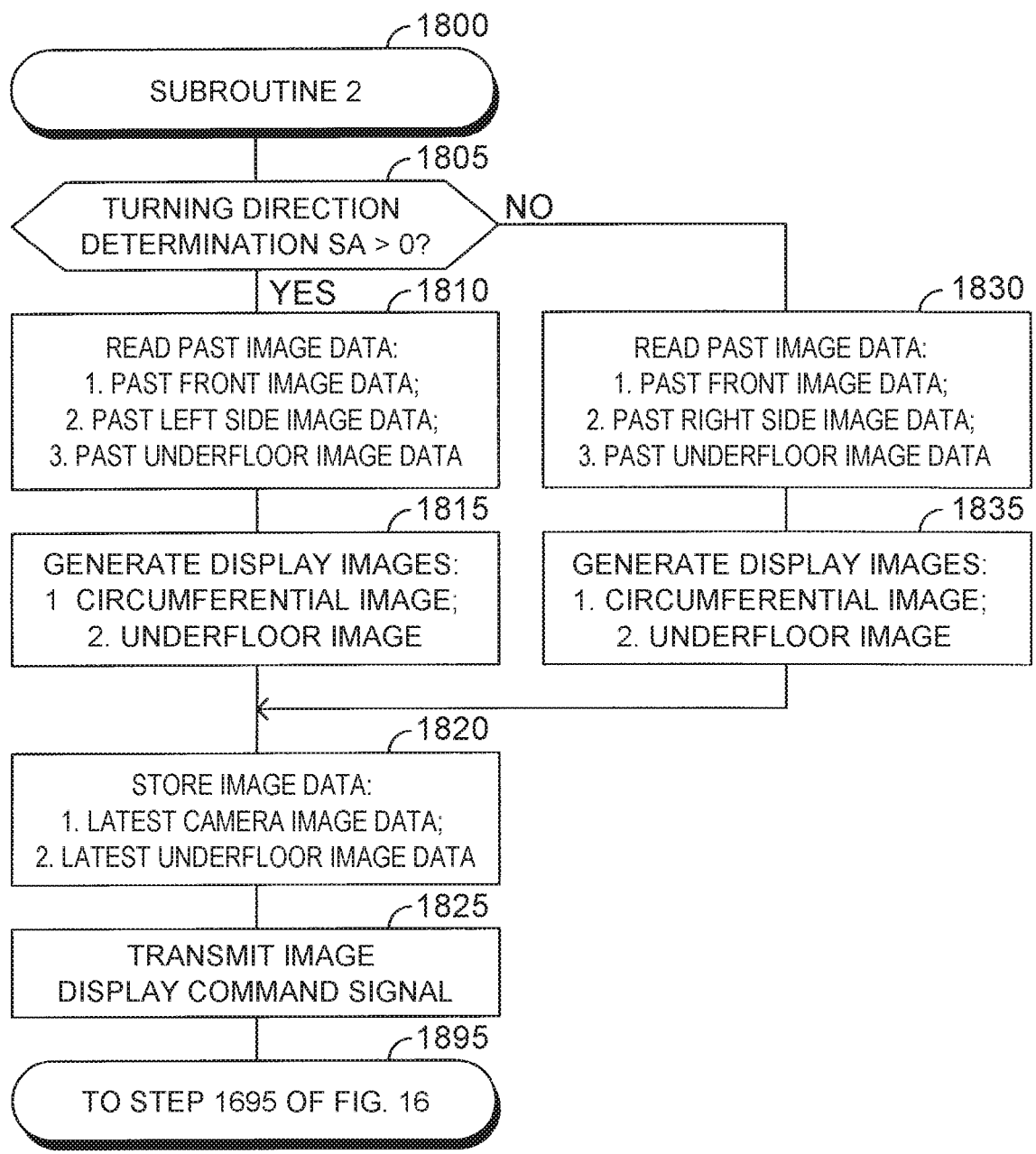
FIG. 18 is a flowchart showing a routine executed by the vehicle periphery monitoring device according to the embodiment of the present disclosure.

When determining "No" in step 1615 of FIG. 16 (i.e., when the vehicle 100 moves forward while making a left turn or a right turn), the CPU advances the process to step 1625 to execute a routine shown in FIG. 18. Therefore, when the CPU advances the process to step 1625, the CPU starts the process from step 1800 of FIG. 18. The CPU advances the process to step 1805 to determine whether or not the steering angle SA is larger than zero (i.e., whether or not the vehicle 100 moves forward while making a left turn).

When determining "Yes" in step 1805 (i.e., when the vehicle 100 moves forward while making a left turn), the CPU advances the process to step 1810 to read the past front image data D11(n−1), the past left side image data D13(n−1), and the past underfloor image data D15(n−1) from the RAM.

Next, the CPU advances the process to step 1815 to generate the circumferential image i0 based on the latest camera image data DO. In addition, the CPU generates the underfloor image i5 based on the past front image data D11(n−1), the past left side image data D13(n−1), and the past underfloor image data D15(n−1) read in step 1810 as described before.

Next, the CPU advances the process to step 1820 to extract the latest camera image data D10(n) from the latest camera image data DO and store the extracted data in the RAM as the new past camera image data D10(n−1). In addition, the CPU stores the data D5 on the underfloor image i5 generated in step 1815 in the RAM as the new past underfloor image data D15(n−1).

Next, the CPU advances the process to step 1825 to transmit the image display command signal Sd to the display 52. As a result, the circumferential image i0 and underfloor image i5 generated in step 1815 are displayed on the display 52 in the form of the overhead image i6. Then, the CPU advances the process to step 1695 of FIG. 16 through step 1895, and temporarily terminates the present routine.

When determining "No" in step 1805 (i.e., when the vehicle 100 moves forward while making a right turn), the CPU advances the process to step 1830 to read the past front image data D11(n−1), the past right side image data D14(n−1), and the past underfloor image data D15(n−1) from the RAM.

Next, the CPU advances the process to step 1835 to generate the circumferential image i0 based on the latest camera image data DO. In addition, the CPU generates the underfloor image i5 based on the past front image data D11(n−1), the past right side image data D14(n−1), and the past underfloor image data D15(n−1) read in step 1830 as described before.

Next, the CPU advances the process to step 1820 to extract the latest camera image data D10(n) from the latest camera image data DO and store the extracted data in the RAM as the new past camera image data D10(n−1). In addition, the CPU stores the data D5 on the underfloor image i5 generated in step 1835 in the RAM as the new past underfloor image data D15(n−1).

Next, the CPU advances the process to step 1825 to transmit the image display command signal Sd to the display 52. As a result, the circumferential image i0 and underfloor image i5 generated in step 1835 are displayed on the display 52 in the form of the overhead image i6. Then, the CPU advances the process to step 1695 of FIG. 16 through step 1895, and temporarily terminates the present routine.

When determining "No" in step 1610 of FIG. 16 (i.e., when the vehicle 100 moves backward), the CPU advances the process to step 1630 to determine whether or not the steering angle SA is zero (i.e., whether or not the vehicle 100 moves straight backward).

Figure 19:
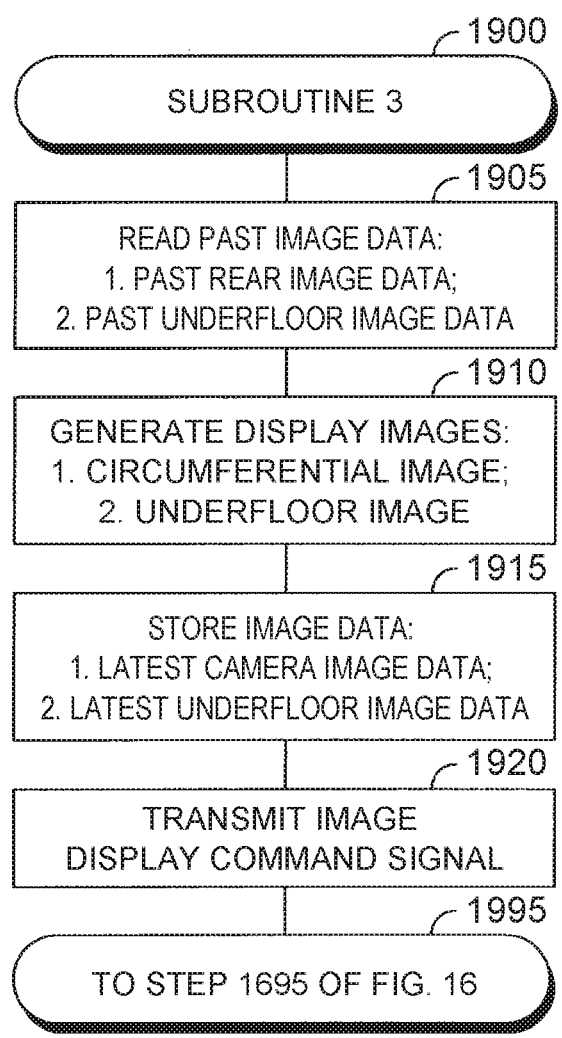
FIG. 19 is a flowchart showing a routine executed by the vehicle periphery monitoring device according to the embodiment of the present disclosure.

When determining "Yes" in step 1630 (i.e., when the vehicle 100 moves straight backward), the CPU advances the process to step 1635 to execute a routine shown in FIG. 19. Therefore, when the CPU advances the process to step 1635, the CPU starts the process from step 1900 of FIG. 19. The CPU advances the process to step 1905 to read the past rear image data D12(n−1), and the past underfloor image data D15(n−1) from the RAM.

Next, the CPU advances the process to step 1910 to generate the circumferential image i0 based on the latest camera image data DO. In addition, the CPU generates the underfloor image i5 based on the past rear image data D12(n−1) and the past underfloor image data D15(n−1) read in step 1905 as described before.

Next, the CPU advances the process to step 1915 to extract the latest camera image data D10(n) from the latest camera image data DO and store the extracted data in the RAM as the new past camera image data D10(n−1). In addition, the CPU stores the data D5 on the underfloor image i5 generated in step 1910 in the RAM as the new past underfloor image data D15(n−1).

Next, the CPU advances the process to step 1920 to transmit the image display command signal Sd to the display 52. As a result, the circumferential image i0 and underfloor image i5 generated in step 1910 are displayed on the display 52 in the form of the overhead image i6. Then, the CPU advances the process to step 1695 of FIG. 16 through step 1995, and temporarily terminates the present routine.

Figure 20:
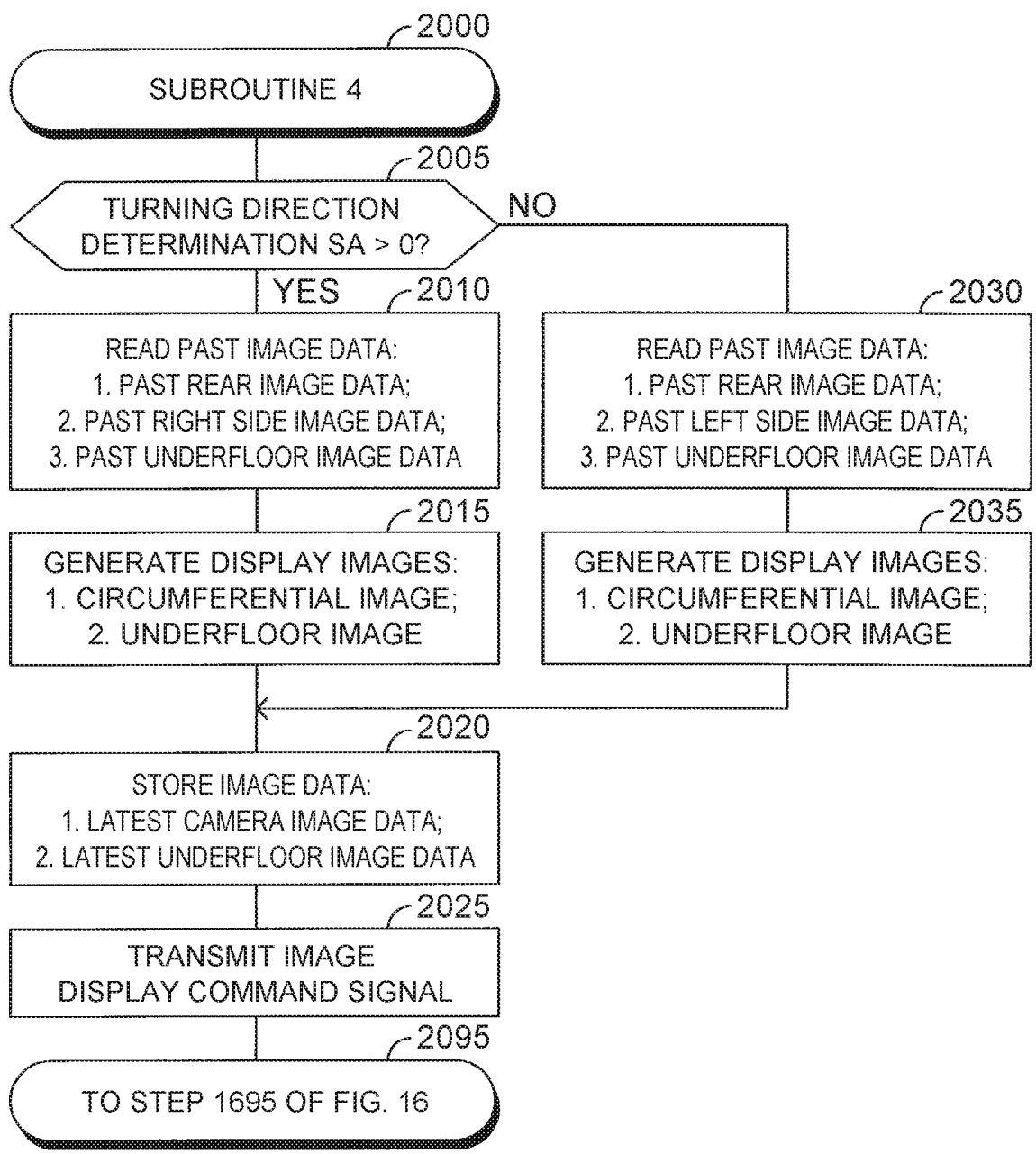
FIG. 20 is a flowchart showing a routine executed by the vehicle periphery monitoring device according to the embodiment of the present disclosure.

When determining "No" in step 1630 of FIG. 16 (i.e., when the vehicle 100 moves backward while making a left turn or a right turn), the CPU advances the process to step 1640 to execute a routine shown in FIG. 20. Therefore, when the CPU advances the process to step 1640, the CPU starts the process from step 2000 of FIG. 20. The CPU advances the process to step 2005 to determine whether or not the steering angle SA is larger than zero (i.e., whether or not the vehicle 100 moves backward while making a left turn).

When determining "Yes" in step 2005 (i.e., when the vehicle 100 moves backward while making a left turn), the CPU advances the process to step 2010 to read the past rear image data D12(n−1), the past right side image data D14(n−1), and the past underfloor image data D15(n−1) from the RAM.

Next, the CPU advances the process to step 2015 to generate the circumferential image i0 based on the latest camera image data DO. In addition, the CPU generates the underfloor image i5 based on the past rear image data D12(n−1), the past right side image data D14(n−1), and the past underfloor image data D15(n−1) read in step 2010 as described before.

Next, the CPU advances the process to step 2020 to extract the latest camera image data D10(n) from the latest camera image data DO and store the extracted data in the RAM as the new past camera image data D10(n−1). In addition, the CPU stores the data D5 on the underfloor image i5 generated in step 2015 in the RAM as the new past underfloor image data D15(*n*–1).

Next, the CPU advances the process to step 2025 to transmit the image display command signal Sd to the display 52. As a result, the circumferential image i0 and the underfloor image i5 generated in step 2015 are displayed on the display 52 in the form of the overhead image i6. Then, the CPU advances the process to step 1695 of FIG. 16 through step 2095, and temporarily terminates the present routine.

When determining "No" in step 2005 (i.e., when the vehicle 100 moves backward while making a right turn), the CPU advances the process to step 2030 to read the past rear image data D12(*n*–1), the past left side image data D13(*n*–1), and the past underfloor image data D15(*n*–1) from the RAM.

Next, the CPU advances the process to step 2035 to generate the circumferential image i0 based on the latest camera image data DO. In addition, the CPU generates the underfloor image i5 based on the past rear image data D12(*n*–1), the past left side image data D13(*n*–1), and the past underfloor image data D15(*n*–1) read in step 2030 as described before.

Next, the CPU advances the process to step 2020 to extract the latest camera image data D10(*n*) from the latest camera image data DO, and store the extracted data in the RAM as the new past camera image data D10(*n*–1). In addition, the CPU stores the data D5 on the underfloor image i5 generated in step 2035 in the RAM as the new past underfloor image data D15(*n*–1).

Next, the CPU advances the process to step 2025 to transmit the image display command signal Sd to the display 52. As a result, the circumferential image i0 and the underfloor image i5 generated in step 2035 are displayed on the display 52 in the form of the overhead image i6. Then, the CPU advances the process to step 1695 of FIG. 16 through step 2095, and temporarily terminates the present routine.

Figure 21:
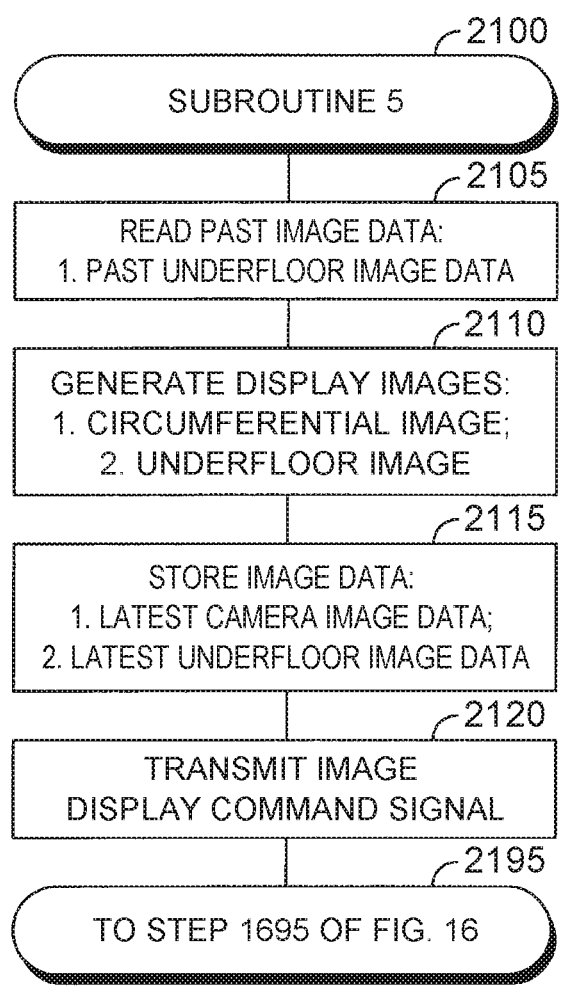
FIG. 21 is a flowchart showing a routine executed by the vehicle periphery monitoring device according to the embodiment of the present disclosure.

When determining "No" in step 1605 of FIG. 16 (i.e., when the vehicle 100 stops, or when the shift lever 42 is set to the neutral position or the parking position), the CPU advances the process to step 1645 to execute a routine shown in FIG. 21. Therefore, when the CPU advances the process to step 1645, the CPU starts the process from step 2100 of FIG. 21. The CPU advances the process to step 2105 to read the past underfloor image data D15(*n*–1) from the RAM.

Next, the CPU advances the process to step 2110 to generate the circumferential image i0 based on the latest camera image data DO. In addition, the CPU generates the underfloor image i5 based on the past underfloor image data D15(*n*–1) read in step 2105. The underfloor image i5 generated at the time is the same as the underfloor image i5 indicated by the past underfloor image data D15(*n*–1).

Next, the CPU advances the process to step 2115 to extract the latest camera image data D10(*n*) from the latest camera image data DO and store the extracted data in the RAM as the new past camera image data D10(*n*–1). In addition, the CPU stores the data D5 on the underfloor image i5 generated in step 2110 in the RAM as the new past underfloor image data D15(*n*–1).

Next, the CPU advances the process to step 2120 to transmit the image display command signal Sd to the display 52. As a result, the circumferential image i0 and the underfloor image i5 generated in step 2110 are displayed on the display 52 in the form of the overhead image i6. Then, the CPU advances the process to step 1695 of FIG. 16 through step 2195, and temporarily terminates the present routine.

The specific operation of the vehicle periphery monitoring device 10 is as described above. When the vehicle 100 travels while making a turn, the vehicle periphery monitoring device 10 executes the routines shown in FIGS. 16 to 21 to generate the underfloor image i5 by using the past left side image data D13(*n*–1) or the past right side image data D14(*n*–1) (see FIGS. 18 and 20). Accordingly, even when the vehicle 100 travels while making a turn, the state of the underfloor of the vehicle 100 is correctly displayed on the display 52.

First Modification

Description is now given of the vehicle periphery monitoring device 10 according to a first modification of the embodiment of the present disclosure.

When the vehicle speed SPD is low, there is a high possibility that the driver sees the underfloor image i5. However, when the vehicle speed SPD is high, there is a low possibility that the driver sees the underfloor image i5. In this relation, arithmetic load applied to the vehicle periphery monitoring device 10 is reduced if the underfloor image i5 is not generated when there is a low possibility that the driver sees the underfloor image i5.

Accordingly, when the vehicle speed SPD is larger than a prescribed vehicle speed SPDth, the vehicle periphery monitoring device 10 according to the first modification generates only the circumferential image i0 without generating the underfloor image i5, and displays the generated circumferential image i0 on the display 52.

When the vehicle speed SPD is equal to or less than the prescribed vehicle speed SPDth, the vehicle periphery monitoring device 10 according to the first modification generates both the circumferential image i0 and the underfloor image i5, and displays the generated circumferential image i0 and underfloor image i5 on the display 52.

This makes it possible to reduce the arithmetic load applied to the vehicle periphery monitoring device 10.

Specific Operation

Description is now given of specific operation of the vehicle periphery monitoring device 10 according to the first modification. The CPU of the ECU 90 of the vehicle periphery monitoring device 10 according to the first modification executes a routine shown in FIG. 22 whenever a predetermined time Tcal lapses.

Figure 22:
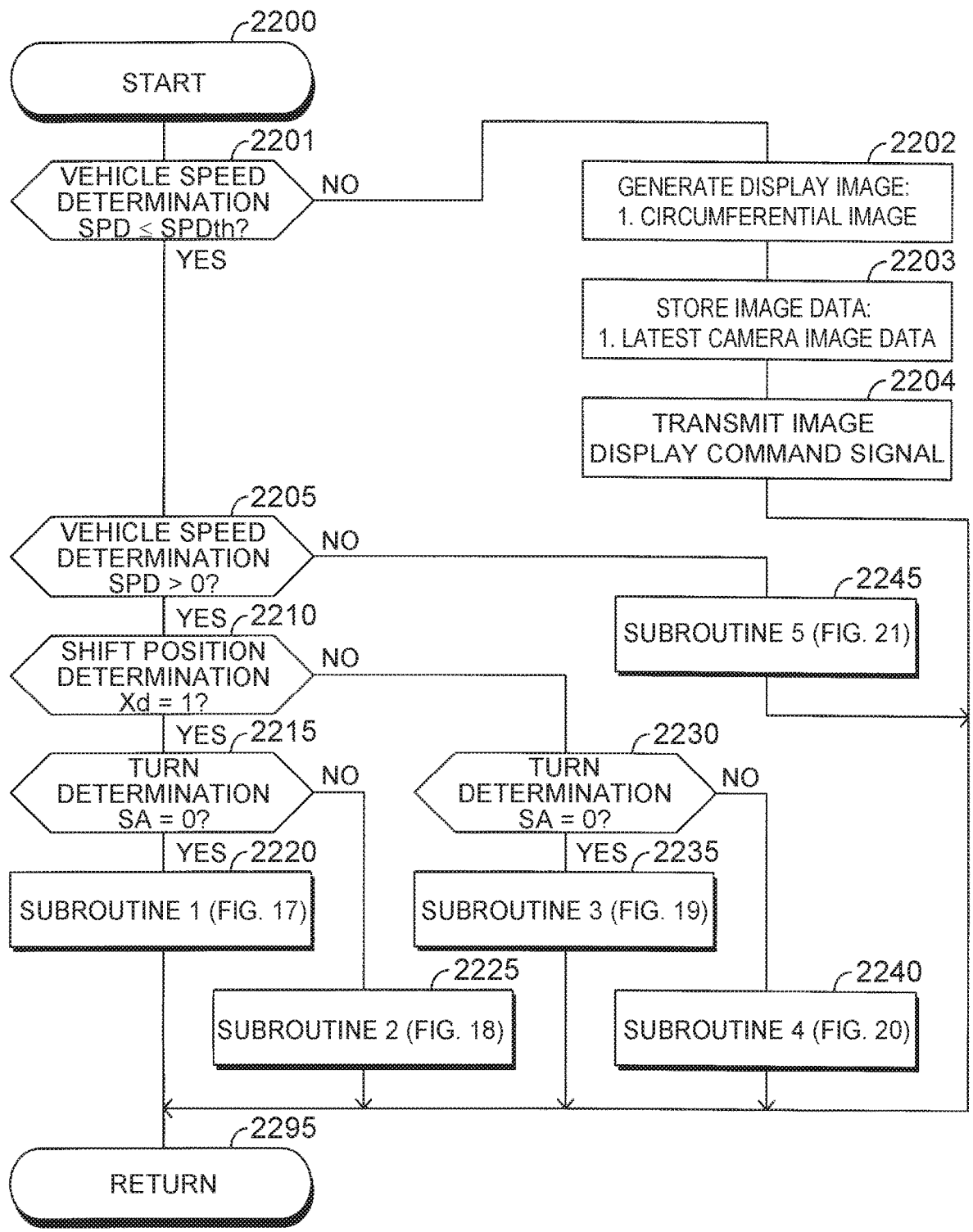
FIG. 22 is a flowchart showing a routine executed by the vehicle periphery monitoring device according to a first modification of the embodiment of the present disclosure.

Therefore, when predetermined timing has come, the CPU starts the process from step 2200 of FIG. 22. Then, the CPU advances the process to step 2201 to determine whether or not the vehicle speed SPD is equal to or less than the prescribed vehicle speed SPDth.

When determining "Yes" in step 2201 (i.e., when the vehicle speed SPD is relatively small), the CPU advances the process to step 2205. The process of steps 2205 to 2245 of FIG. 22 is the same as that of steps 1605 to 1645 of FIG. 16, respectively.

When determining "No" in step 2201 (i.e., when the vehicle speed SPD is relatively large), the CPU advances the process to step 2202 to generate the circumferential image i0 based on the latest camera image data DO. At the time, the CPU does not generate the underfloor image i5.

Next, the CPU advances the process to step 2203 to extract latest camera image data D10(*n*) from the latest camera image data DO and store the extracted data in the RAM as the new past camera image data D10(*n*–1).

Next, the CPU advances the process to step 2204 to transmit the image display command signal Sd to the display 52. As a result, the circumferential image i0 generated in step 2202 is displayed on the display 52 in the form of the overhead image i6. In this case, the underfloor image i5 is not displayed on the display 52. Then, the CPU advances the process to step 2295, and temporarily terminates the present routine.

The specific operation of the vehicle periphery monitoring device 10 according to the first modification is as described above. Since the vehicle periphery monitoring device 10 executes the routine shown in FIG. 22, the underfloor image i5 is not generated when the vehicle speed SPD is larger than the prescribed vehicle speed SPDth. This reduces the arithmetic load applied to the vehicle periphery monitoring device 10.

Second Modification

Description is now given of the vehicle periphery monitoring device 10 according to a second modification of the embodiment of the present disclosure.

For example, when the vehicle 100 moves forward while making a left turn, the underfloor image i5 can be generated by using the past front image data D11($n$−1), the past left side image data D13($n$−1), and the past underfloor image data D15($n$−1). In other words, the underfloor image i5 is generated without using the past rear image data D12($n$−1) and the past right side image data D14($n$−1).

Therefore, when the vehicle 100 moves forward while making a left turn, it is not necessary to store the latest rear image data D12($n$) and the latest right side image data D14($n$) as the past rear image data D12($n$−1) and past right side image data D14($n$−1) in the RAM. Therefore, the amount of data to be stored in the RAM can be reduced when only the image data that is minimum required to generate the underfloor image i5 is stored in the RAM.

Accordingly, when the vehicle 100 moves forward while making a left turn, the vehicle periphery monitoring device 10 according to the second modification generates the underfloor image i5, and then stores the latest front image data D11($n$) and the latest left side image data D13($n$) in the RAM as the new past front image data D11($n$−1) and past left side image data D13($n$−1), respectively, without storing the latest rear image data D12($n$) and the latest right side image data D14($n$) in the RAM. Of course, in this case, the vehicle periphery monitoring device 10 according to the second modification generates the underfloor image i5, and then stores the data D5 on the generated underfloor image i5 in the RAM as the past underfloor image data D15($n$−1).

Moreover, when the vehicle 100 moves forward while making a right turn, the vehicle periphery monitoring device 10 according to the second modification generates the underfloor image i5, and then stores the latest front image data D11($n$) and the latest right side image data D14($n$) in the RAM as the new past front image data D11($n$−1) and past right side image data D14($n$−1), respectively, without storing the latest rear image data D12($n$) and the latest left side image data D13($n$) in the RAM. Of course, also in this case, the vehicle periphery monitoring device 10 according to the second modification generates the underfloor image i5, and then stores the data D5 on the generated underfloor image i5 in the RAM as the past underfloor image data D15($n$−1).

Moreover, when the vehicle 100 moves backward while making a left turn, the vehicle periphery monitoring device 10 according to the second modification generates the underfloor image i5, and then stores the latest rear image data D12($n$) and the latest right side image data D14($n$) in the RAM as the new past rear image data D12($n$−1) and past right side image data D14($n$−1), respectively, without storing the latest front image data D11($n$) and the latest left side image data D13($n$) in the RAM. Of course, also in this case, the vehicle periphery monitoring device 10 according to the second modification generates the underfloor image i5, and then stores the data D5 on the generated underfloor image i5 in the RAM as the past underfloor image data D15($n$−1).

Moreover, when the vehicle 100 moves backward while making a right turn, the vehicle periphery monitoring device 10 according to the second modification generates the underfloor image i5, and then stores the latest rear image data D12($n$) and the latest left side image data D13($n$) in the RAM as the new past rear image data D12($n$−1) and past left side image data D13($n$−1), respectively, without storing the latest front image data D11($n$) and the latest right side image data D14($n$) in the RAM. Of course, also in this case, the vehicle periphery monitoring device 10 according to the second modification generates the underfloor image i5, and then stores the data D5 on the generated underfloor image i5 in the RAM as the past underfloor image data D15($n$−1).

According to the configuration, since only the image data that is minimum required to generate the underfloor image i5 is stored in the RAM, the amount of data to be stored in the RAM can be reduced.

Specific Operation

Description is now given of specific operation of the vehicle periphery monitoring device 10 according to the second modification. The CPU of the ECU 90 of the vehicle periphery monitoring device 10 according to the second modification executes the routine shown in FIG. 16 or 22 whenever a predetermined time Tcal lapses. However, the CPU executes a routine shown in FIG. 23 in step 1625 of FIG. 16 or in step 2225 of FIG. 22 in place of the routine shown in FIG. 18. The CPU also executes a routine shown in FIG. 24 in step 1640 of FIG. 16 or in step 2240 of FIG. 22 in place of the routine shown in FIG. 20. Hereinafter, the routines shown in FIGS. 23 and 24 will mainly be described.

Figure 23:
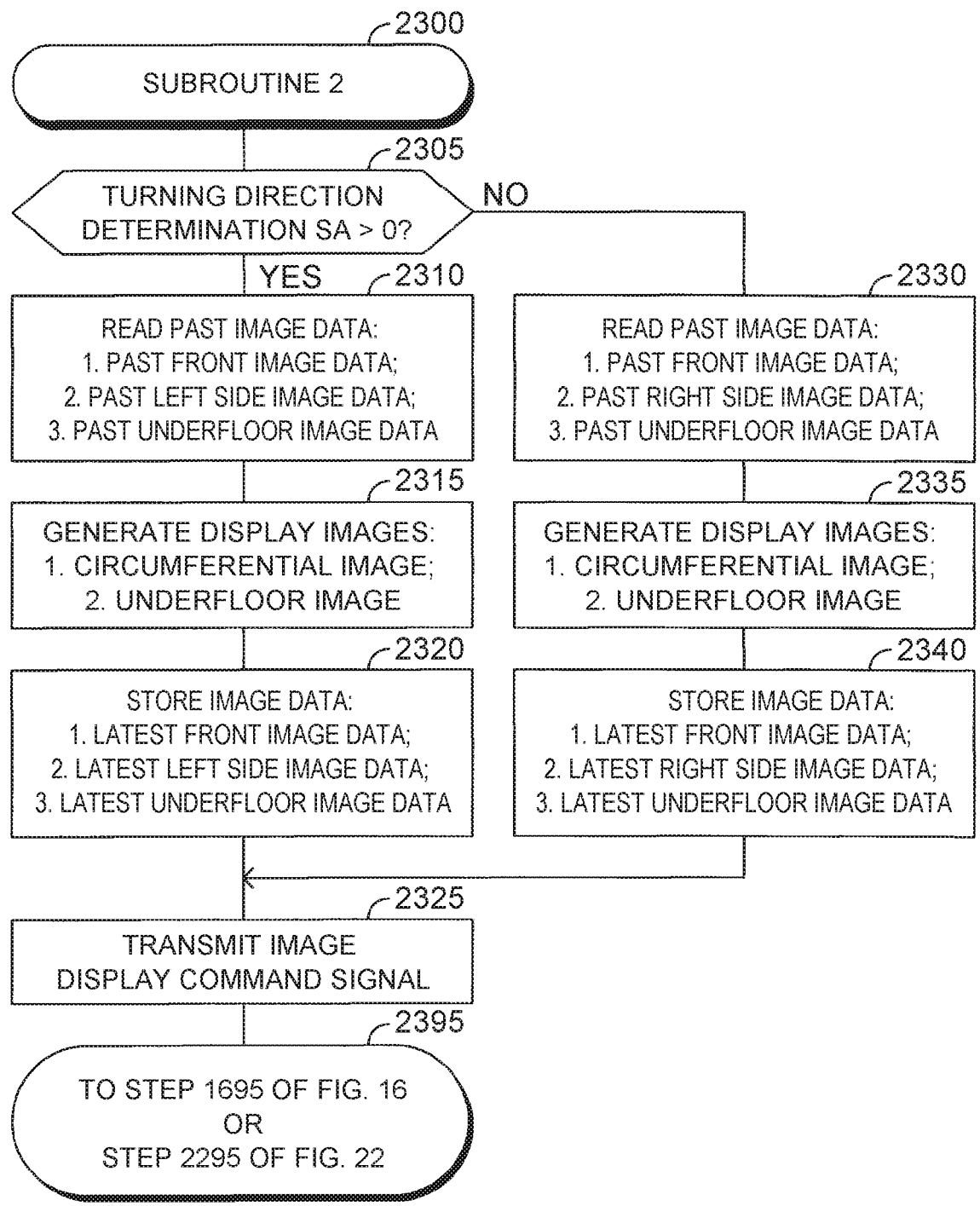
FIG. 23 is a flowchart showing a routine executed by the vehicle periphery monitoring device according to a second modification of the embodiment of the present disclosure.

When determining "No" in step 1615 of FIG. 16 or step 2215 of FIG. 22 (i.e., when the vehicle 100 moves forward while making a left turn or a right turn), the CPU according to the second modification advances the process to step 1625 of FIG. 16 or step 2225 of FIG. 22 to execute the routine shown in FIG. 23.

Therefore, when the CPU advances the process to step 1625 of FIG. 16 or step 2225 of FIG. 22, the CPU starts the process from step 2300 of FIG. 23. The CPU then advances the process to step 2305 to determine whether or not the steering angle SA is larger than zero (i.e., whether or not the vehicle 100 moves forward while making a left turn).

When determining "Yes" in step 2305 (i.e., when the vehicle 100 moves forward while making a left turn), the CPU advances the process to step 2310 to read the past front image data D11($n$−1), the past left side image data D13($n$−1), and the past underfloor image data D15($n$−1) from the RAM.

Next, the CPU advances the process to step 2315 to generate the circumferential image i0 based on the latest camera image data DO. In addition, the CPU generates the underfloor image i5 based on the past front image data D11($n$−1), the past left side image data D13($n$−1), and the past underfloor image data D15($n$−1) read in step 2310.

Next, the CPU advances the process to step 2320 to extract the latest front image data D11($n$) and the latest left side image data D13($n$) from the latest camera image data DO and store the extracted data as the new past front image data D11($n$−1) and past left side image data D13($n$−1) in the RAM. In addition, the CPU stores the data D5 on the underfloor image i5 generated in step 1815 in the RAM as the new past underfloor image data D15($n$−1).

Next, the CPU advances the process to step 2325 to transmit the image display command signal Sd to the display 52. As a result, the circumferential image i0 and the underfloor image i5 generated in step 2315 are displayed on the display 52 in the form of the overhead image i6. Then, the CPU advances the process to step 1695 of FIG. 16 or step 2295 of FIG. 22 through step 2395, and temporarily terminates the present routine.

When determining "No" in step 2305 (i.e., when the vehicle 100 moves forward while making a right turn), the CPU advances the process to step 2330 to read the past front image data D11($n$–1), the past right side image data D14($n$–1), and the past underfloor image data D15($n$–1) from the RAM.

Next, the CPU advances the process to step 2335 to generate the circumferential image i0 based on the latest camera image data DO. In addition, the CPU generates the underfloor image i5 based on the past front image data D11($n$–1), the past right side image data D14($n$–1), and the past underfloor image data D15($n$–1) read in step 2330.

Next, the CPU advances the process to step 2340 to extract the latest front image data D11($n$) and the latest right side image data D14($n$) from the latest camera image data DO and store the extracted data as the new past front image data D11($n$–1) and past right side image data D14($n$–1) in the RAM. In addition, the CPU stores the data D5 on the underfloor image i5 generated in step 2335 in the RAM as the new past underfloor image data D15($n$–1).

Next, the CPU advances the process to step 2325 to transmit the image display command signal Sd to the display 52. As a result, the circumferential image i0 and the underfloor image i5 generated in step 2335 are displayed on the display 52 in the form of the overhead image i6. Then, the CPU advances the process to step 1695 of FIG. 16 or step 2295 of FIG. 22 through step 2395, and temporarily terminates the present routine.

Figure 24:
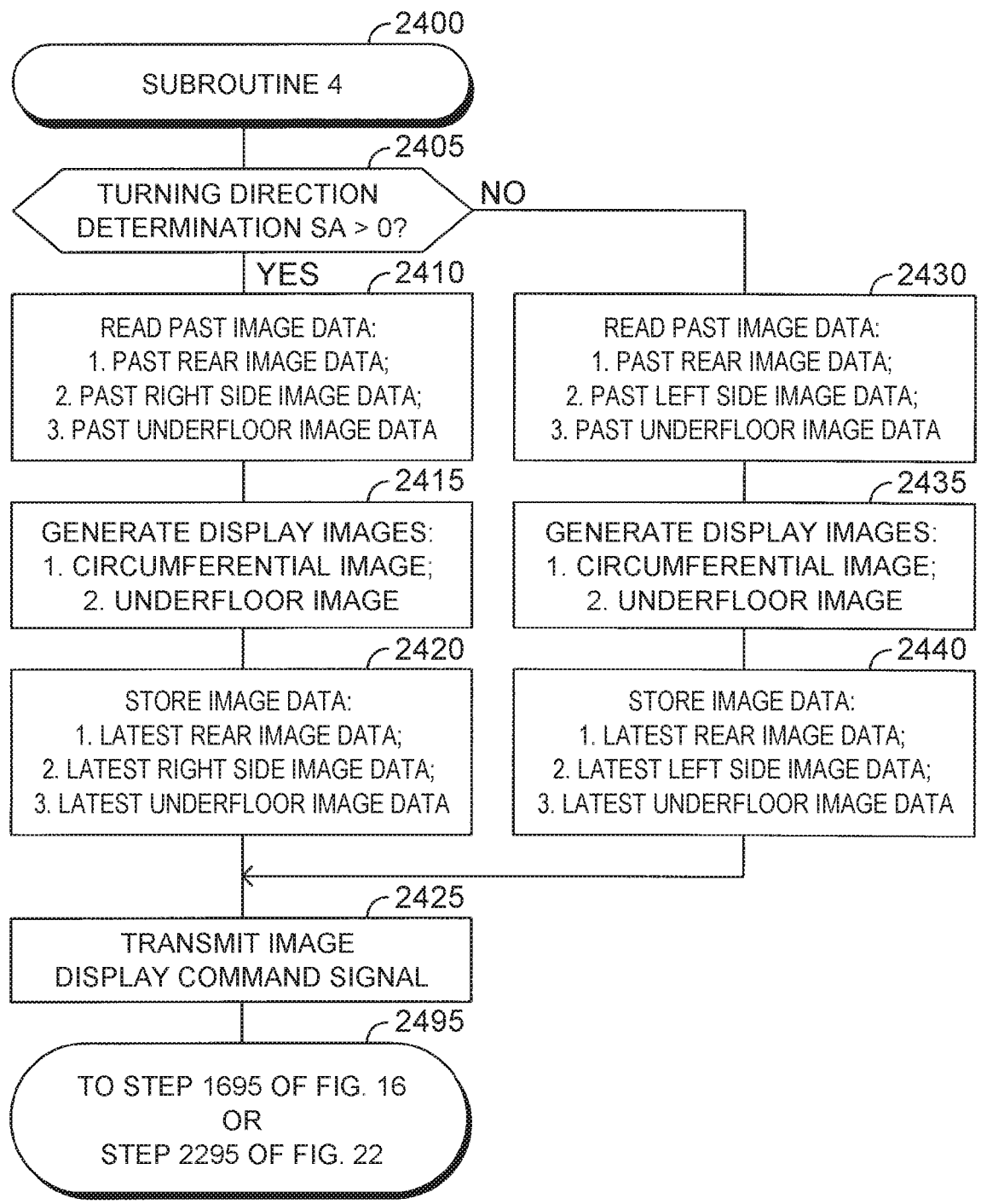
FIG. 24 is a flowchart showing a routine executed by the vehicle periphery monitoring device according to the second modification of the embodiment of the present disclosure.

When determining "No" in step 1630 of FIG. 16 or step 2230 of FIG. 22 (i.e., when the vehicle 100 moves backward while making a left turn or a right turn), the CPU according to the second modification advances the process to step 1640 of FIG. 16 or step 2240 of FIG. 22 to execute a routine shown in FIG. 24.

Therefore, when the CPU advances the process to step 1640 of FIG. 16 or step 2240 of FIG. 22, the CPU starts the process from step 2400 of FIG. 24. The CPU then advances the process to step 2405 to determine whether or not the steering angle SA is larger than zero (i.e., whether or not the vehicle 100 moves backward while making a left turn).

When determining "Yes" in step 2405 (i.e., when the vehicle 100 moves backward while making a left turn), the CPU advances the process to step 2410 to read the past rear image data D12($n$–1), the past right side image data D14($n$–1), and the past underfloor image data D15($n$–1) from the RAM.

Next, the CPU advances the process to step 2415 to generate the circumferential image i0 based on the latest camera image data DO. In addition, the CPU generates the underfloor image i5 based on the past rear image data D12($n$–1), the past right side image data D14($n$–1), and the past underfloor image data D15($n$–1) read in step 2410.

Next, the CPU advances the process to step 2420 to extract the latest rear image data D12($n$) and the latest right side image data D14($n$) from the latest camera image data DO and store the extracted data as the new past rear image data D12($n$–1) and past right side image data D14($n$–1) in the RAM. In addition, the CPU stores the data D5 on the underfloor image i5 generated in step 2415 in the RAM as the new past underfloor image data D15($n$–1).

Next, the CPU advances the process to step 2425 to transmit the image display command signal Sd to the display 52. As a result, the circumferential image i0 and the underfloor image i5 generated in step 2415 are displayed on the display 52 in the form of the overhead image i6. Then, the CPU advances the process to step 1695 of FIG. 16 or step 2295 of FIG. 22 through step 2495, and temporarily terminates the present routine.

When determining "No" in step 2405 (i.e., when the vehicle 100 moves backward while making a right turn), the CPU advances the process to step 2430 to read the past rear image data D12($n$–1), the past left side image data D13($n$–1), and the past underfloor image data D15($n$–1) from the RAM.

Next, the CPU advances the process to step 2435 to generate the circumferential image i0 based on the latest camera image data DO. In addition, the CPU generates the underfloor image i5 based on the past rear image data D12($n$–1), the past left side image data D13($n$–1), and the past underfloor image data D15($n$–1) read in step 2430.

Next, the CPU advances the process to step 2440 to extract the latest rear image data D12($n$) and the latest left side image data D13($n$) from the latest camera image data DO and store the extracted data as the new past rear image data D12($n$–1) and past left side image data D13($n$–1) in the RAM. In addition, the CPU stores the data D5 on the underfloor image i5 generated in step 2435 in the RAM as the new past underfloor image data D15($n$–1).

Next, the CPU advances the process to step 2425 to transmit the image display command signal Sd to the display 52. As a result, the circumferential image i0 and the underfloor image i5 generated in step 2435 are displayed on the display 52 in the form of the overhead image i6. Then, the CPU advances the process to step 1695 of FIG. 16 or step 2295 of FIG. 22 through step 2495, and temporarily terminates the present routine.

The specific operation of the vehicle periphery monitoring device 10 according to the second modification is as described above. Since only the image data minimum required to generate the underfloor image i5 is stored in the RAM when the vehicle periphery monitoring device 10 according to second modification executes the routines shown in FIGS. 23 and 24, the amount of data to be stored in the RAM is reduced Third Modification Description is now given of the vehicle periphery monitoring device 10 according to a third modification of the embodiment of the present disclosure.

Figure 25:
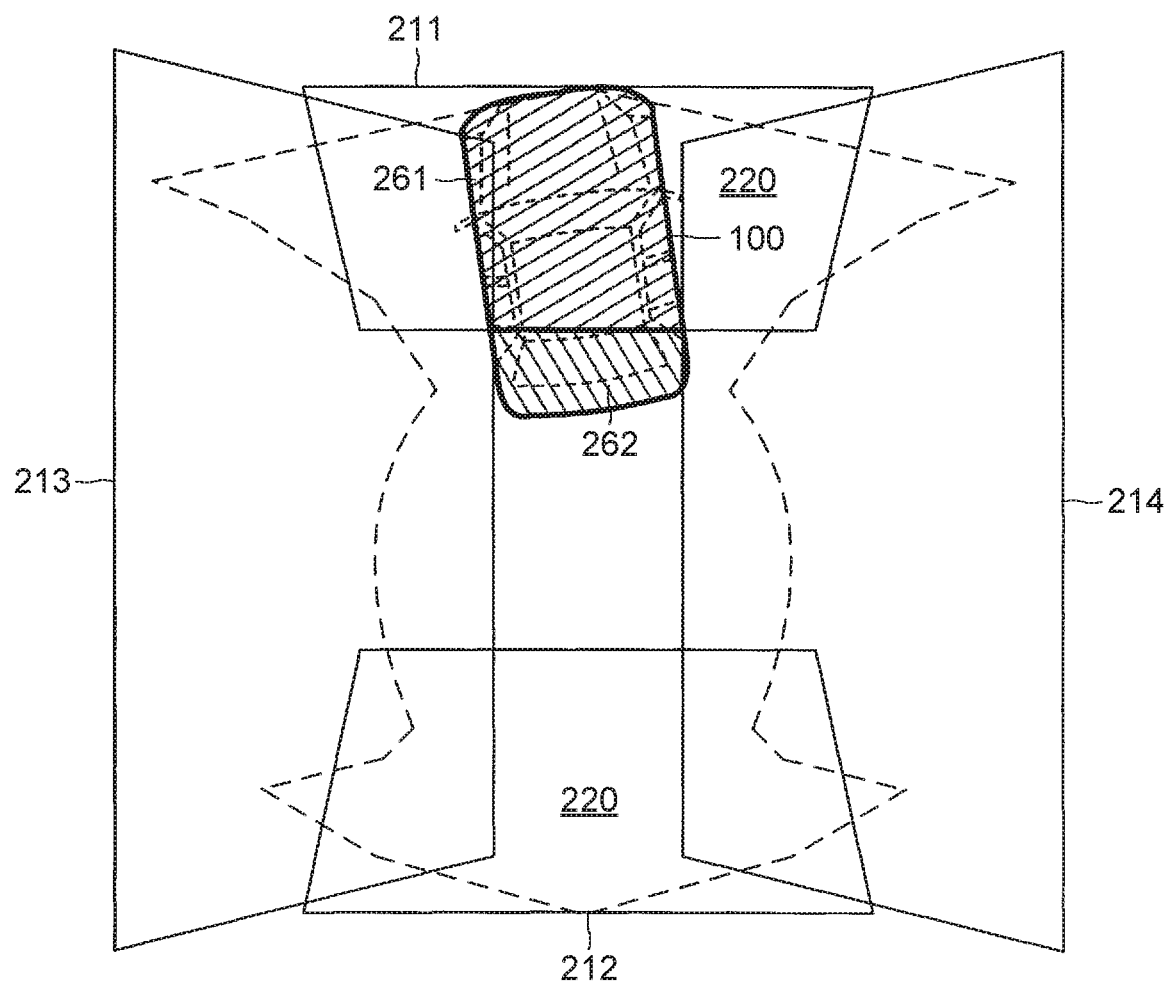
FIG. 25 illustrates operation of the vehicle periphery monitoring device according to a third modification of the embodiment of the present disclosure.

For example, when the vehicle 100 moves forward while making a left turn and the steering angle SA is relatively small as shown in FIG. 25, it may be possible to generate the underfloor image i5 by using the past front image data D11($n$–1) and the past underfloor image data D15($n$–1). In other words, the underfloor image i5 may be generated without the necessity of using the past left side image data D13($n$–1).

Therefore, when the vehicle 100 moves forward while making a left turn and the steering angle SA is relatively small, it may be unnecessary to store the latest left side image data D13($n$) in the RAM as the past left side image data D13($n$–1). Therefore, the amount of data to be stored in the RAM can be reduced when only the image data that is minimum required to generate the underfloor image i5 is stored in the RAM.

Accordingly, when the vehicle 100 moves forward while making a left turn and an absolute value of the steering angle SA is equal to or less than a prescribed first steering angle SA1, the vehicle periphery monitoring device 10 according to the third modification generates the underfloor image i5 by using only the past front image data D11($n-1$) and the past underfloor image data D15($n-1$). In other words, when the vehicle 100 moves forward while making a left turn and a turning radius of the vehicle 100 is equal to or more than a prescribed first turning radius, the vehicle periphery monitoring device 10 generates the underfloor image i5 by using only the past front image data D11($n-1$) and the past underfloor image data D15($n-1$).

In the example shown in FIG. 25, the vehicle periphery monitoring device generates a portion of the underfloor image i5 corresponding to the range 261 shown in FIG. 25 by using the past front image data D11($n-1$), and generates a portion of the underfloor image i5 corresponding to the range 262 shown in FIG. 25 by using the past underfloor image data D15($n-1$). The vehicle periphery monitoring device 10 then combines these portions into the underfloor image i5.

In this case (i.e., when the vehicle 100 moves forward while making a left turn and the turning radius of the vehicle 100 is equal to or more than the prescribed first turning radius), the vehicle periphery monitoring device 10 stores the latest front image data D11($n$) in the RAM as the new past front image data D11($n-1$). In addition, the vehicle periphery monitoring device 10 stores the data D5 on the generated underfloor image i5 in the RAM as the new past underfloor image data D15($n-1$).

The first steering angle SA1 is set to a maximum value of the steering angle SA that allows generation of the underfloor image i5 without using the past left turn image data D13($n-1$) and the past right side image data D14($n-1$) when the vehicle 100 moves forward while making a turn.

When the vehicle 100 moves forward while making a left turn and the absolute value of steering angle SA is larger than the first steering angle SA1, the vehicle periphery monitoring device 10 according to the third modification generates the underfloor image i5 as in the second modification. In other words, when the vehicle 100 moves forward while making a left turn and the turning radius of the vehicle 100 is smaller than the first turning radius, the vehicle periphery monitoring device 10 generates the underfloor image i5 as in the second modification.

In this case, the vehicle periphery monitoring device 10 stores the latest front image data D11($n$) and the latest left side image data D13($n$) in the RAM as the new past front image data D11($n-1$) and past left side image data D13($n-1$), respectively. In addition, the vehicle periphery monitoring device 10 stores the data D5 on the generated underfloor image i5 in the RAM as the new past underfloor image data D15($n-1$).

Moreover, when the vehicle 100 moves forward while making a right turn and the absolute value of the steering angle SA is equal to or less than the prescribed first steering angle SA1, the vehicle periphery monitoring device 10 according to the third modification generates the underfloor image i5 by using only the past front image data D11($n-1$) and the past underfloor image data D15($n-1$). In other words, when the vehicle 100 moves forward while making a right turn and the turning radius of the vehicle 100 is equal to or more than the first turning radius, the vehicle periphery monitoring device 10 generates the underfloor image i5 by using only the past front image data D11($n-1$) and the past underfloor image data D15($n-1$).

In this case, the vehicle periphery monitoring device 10 stores the latest front image data D11($n$) in the RAM as the new past front image data D11($n-1$). In addition, the vehicle periphery monitoring device 10 stores the data D5 on the generated underfloor image i5 in the RAM as the new past underfloor image data D15($n-1$).

When the vehicle 100 moves forward while making a right turn and the absolute value of the steering angle SA is larger than the first steering angle SA1, the vehicle periphery monitoring device 10 according to the third modification generates the underfloor image i5 as in the case of the second modification. In other words, when the vehicle 100 moves forward while making a right turn and the turning radius of the vehicle 100 is smaller than the first turning radius, the vehicle periphery monitoring device 10 generates the underfloor image i5 as in the case of the second modification.

In this case, the vehicle periphery monitoring device 10 stores the latest front image data D11($n$) and the latest right side image data D14($n$) in the RAM as the new past front image data D11($n-1$) and past right side image data D14($n-1$), respectively. In addition, the vehicle periphery monitoring device 10 stores the data D5 on the generated underfloor image i5 in the RAM as the new past underfloor image data D15($n-1$).

When the vehicle 100 moves backward while making a left turn and the absolute value of the steering angle SA is equal to or less than a prescribed second steering angle SA2, the vehicle periphery monitoring device 10 according to the third modification generates the underfloor image i5 by using only the past rear image data D12($n-1$) and the past underfloor image data D15($n-1$). In other words, when the vehicle 100 moves backward while making a left turn and the turning radius of the vehicle 100 is equal to or more than a prescribed second turning radius, the vehicle periphery monitoring device 10 generates the underfloor image i5 by using only the past rear image data D12($n-1$) and the past underfloor image data D15($n-1$).

In this case, the vehicle periphery monitoring device 10 stores the latest rear image data D12($n$) in the RAM as the new past rear image data D12($n-1$). In addition, the vehicle periphery monitoring device 10 stores the data D5 on the generated underfloor image i5 in the RAM as the new past underfloor image data D15($n-1$).

The second steering angle SA2 is set to a maximum value of the steering angle SA that allows generation of the underfloor image i5 without using the past left side image data D13($n-1$) and the past right side image data D14($n-1$) when the vehicle 100 moves backward while making a turn.

When the vehicle 100 moves backward while making a left turn and the absolute value of the steering angle SA is larger than the second steering angle SA2, the vehicle periphery monitoring device 10 according to the third modification generates the underfloor image i5 as in the second modification. In other words, when the vehicle 100 moves backward while making a left turn and the turning radius of the vehicle 100 is smaller than the second turning radius, the vehicle periphery monitoring device 10 generates the underfloor image i5 as in the second modification.

In this case, the vehicle periphery monitoring device 10 stores the latest rear image data D12($n$) and the latest right side image data D14($n$) in the RAM as the new past rear image data D12($n-1$) and past right side image data D14($n-1$), respectively. In addition, the vehicle periphery monitoring device 10 stores the data D5 on the generated underfloor image i5 in the RAM as the new past underfloor image data D15($n-1$).

Furthermore, when the vehicle 100 moves backward while making a right turn and the absolute value of the steering angle SA is equal to or less than the second steering angle SA2, the vehicle periphery monitoring device 10 according to the third modification generates the underfloor image i5 by using only the past rear image data D12(n−1) and the past underfloor image data D15(n−1). In other words, when the vehicle 100 moves backward while making a right turn and the turning radius of the vehicle 100 is equal to or more than the second turning radius, the vehicle periphery monitoring device 10 generates the underfloor image i5 by using only the past rear image data D12(n−1) and the past underfloor image data D15(n−1).

In this case, the vehicle periphery monitoring device 10 stores the latest rear image data D12(n) in the RAM as the new past rear image data D12(n−1). In addition, the vehicle periphery monitoring device 10 stores the data D5 on the generated underfloor image i5 in the RAM as the new past underfloor image data D15(n−1).

When the vehicle 100 moves backward while making a right turn and the absolute value of steering angle SA is larger than the second steering angle SA2, the vehicle periphery monitoring device 10 according to the third modification generates the underfloor image i5 as in the second modification. In other words, when the vehicle 100 moves backward while making a right turn and the turning radius of the vehicle 100 is smaller than the second turning radius, the vehicle periphery monitoring device 10 generates the underfloor image i5 as in the second modification.

In this case, the vehicle periphery monitoring device 10 stores the latest rear image data D12(n) and the latest left side image data D13(n) in the RAM as the new past rear image data D12(n−1) and past left side image data D13(n−1), respectively. In addition, the vehicle periphery monitoring device 10 stores the data D5 on the generated underfloor image i5 in the RAM as the new past underfloor image data D15(n−1).

According to the configuration, since only the image data that is minimum required to generate the underfloor image i5 is stored in the RAM, the amount of data to be stored in the RAM can be reduced.

Specific Operation

Description is now given of specific operation of the vehicle periphery monitoring device 10 according to the third modification. The CPU of the ECU 90 of the vehicle periphery monitoring device 10 according to the third modification executes the routine shown in FIG. 16 or 22 whenever a predetermined time Tcal lapses. However, the CPU executes a routine shown in FIG. 26 in place of the routine shown in FIG. 18 in step 1625 of FIG. 16 or in step 2225 of FIG. 22. The CPU also executes a routine shown in FIG. 27 in place of the routine shown in FIG. 20 in step 1640 of FIG. 16 or in step 2240 of FIG. 22. Hereinafter, the routines shown in FIGS. 26 and 27 will mainly be described.

Figure 26:
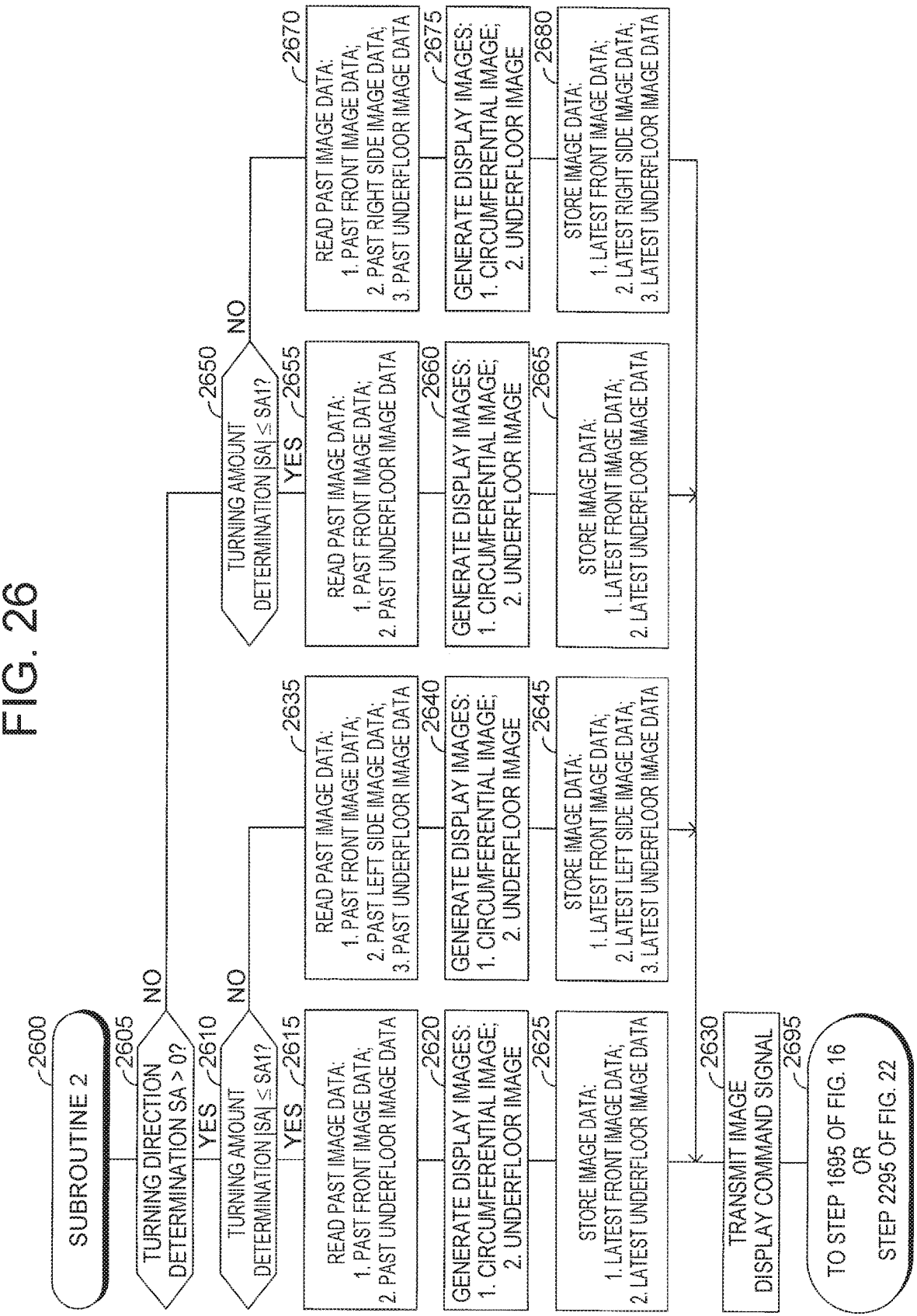
FIG. 26 is a flowchart showing a routine executed by the vehicle periphery monitoring device according to the third modification of the embodiment of the present disclosure.

When determining "No" in step 1615 of FIG. 16 or step 2215 of FIG. 22 (i.e., when the vehicle 100 moves forward while making a left turn or a right turn), the CPU according to the third embodiment advances the process to step 1625 of FIG. 16 or step 2225 of FIG. 22 to execute a routine shown in FIG. 26.

Therefore, when the CPU advances the process to step 1625 of FIG. 16 or step 2225 of FIG. 22, the CPU starts the process from step 2600 of FIG. 26. The CPU then advances the process to step 2605 to determine whether or not the steering angle SA is larger than zero (i.e., whether or not the vehicle 100 moves forward while making a left turn).

When determining "Yes" in step 2605, the CPU advances the process to step 2610 to determine whether or not the absolute value of the steering angle SA is equal to or less than the first steering angle SA1 (i.e., whether or not the degree of the first turn of the vehicle 100 is relatively small).

When determining "Yes" in step 2610 (i.e., when the degree of the left turn of the vehicle 100 is relatively small), the CPU advances the process to step 2615 to read the past front image data D11(n−1) and the past underfloor image data D15(n−1) from the RAM.

Next, the CPU advances the process to step 2620 to generate the circumferential image i0 based on the latest camera image data DO. In addition, the CPU generates the underfloor image i5 based on the past front image data D11(n−1) and the past underfloor image data D15(n−1) read in step 2615.

Next, the CPU advances the process to step 2625 to extract the latest front image data D11(n) from the latest camera image data DO and store the extracted data in the RAM as the new past front image data D11(n−1). In addition, the CPU stores the data D5 on the underfloor image i5 generated in step 2620 in the RAM as the new past underfloor image data D15(n−1).

Next, the CPU advances the process to step 2630 to transmit the image display command signal Sd to the display 52. As a result, the circumferential image i0 and the underfloor image i5 generated in step 2620 are displayed on the display 52 in the form of the overhead image i6. Then, the CPU advances the process to step 1695 of FIG. 16 or step 2295 of FIG. 22 through step 2695, and temporarily terminates the present routine.

When determining "No" in step 2610 (i.e., when the degree of the left turn of the vehicle 100 is relatively large), the CPU advances the process to step 2635 to read the past front image data D11(n−1), the past left side image data D13(n−1), and the past underfloor image data D15(n−1) from the RAM.

Next, the CPU advances the process to step 2640 to generate the circumferential image i0 based on the latest camera image data DO. In addition, the CPU generates the underfloor image i5 based on the past front image data D11(n−1), the past left side image data D13(n−1), and the past underfloor image data D15(n−1) read in step 2635.

Next, the CPU advances the process to step 2645 to extract the latest front image data D11(n) and the latest left side image data D13(n) from the latest camera image data DO, and store the extracted data as the new past front image data D11(n−1) and past left side image data D13(n−1) in the RAM. In addition, the CPU stores the data D5 on the underfloor image i5 generated in step 2640 in the RAM as the new past underfloor image data D15(n−1).

Next, the CPU advances the process to step 2630 to transmit the image display command signal Sd to the display 52. As a result, the circumferential image i0 and the underfloor image i5 generated in step 2640 are displayed on the display 52 in the form of the overhead image i6. Then, the CPU advances the process to step 1695 of FIG. 16 or step 2295 of FIG. 22 through step 2695, and temporarily terminates the present routine.

When determining "No" in step 2605 (i.e., when the vehicle 100 moves forward making a right turn), the CPU advances the process to step 2650 to determine whether or not the absolute value of the steering angle SA is equal to or less than the first steering angle SA1 (i.e., whether or not the degree of the right turn of the vehicle 100 is relatively small).

When determining "Yes" in step 2650 (i.e., when the degree of the right turn of the vehicle 100 is relatively small), the CPU advances the process to step 2655 to read the past front image data D11(n−1) and the past underfloor image data D15(n−1) from the RAM.

Next, the CPU advances the process to step 2660 to generate the circumferential image i0 based on the latest camera image data DO. In addition, the CPU generates the underfloor image i5 based on the past front image data D11(*n*–1) and the past underfloor image data D15(*n*–1) read in step 2655.

Next, the CPU advances the process to step 2665 to extract the latest front image data D11(*n*) from the latest camera image data DO and store the extracted data in the RAM as the new past front image data D11(*n*–1). In addition, the CPU stores the data D5 on the underfloor image i5 generated in step 2660 in the RAM as the new past underfloor image data D15(*n*–1).

Next, the CPU advances the process to step 2630 to transmit the image display command signal Sd to the display 52. As a result, the circumferential image i0 and the underfloor image i5 generated in step 2660 are displayed on the display 52 in the form of the overhead image i6. Then, the CPU advances the process to step 1695 of FIG. 16 or step 2295 of FIG. 22 through step 2695, and temporarily terminates the present routine.

When determining "No" in step 2650 (i.e., when the degree of the right turn of the vehicle 100 is relatively large), the CPU advances the process to step 2670 to read the past front image data D11(*n*–1), the past right side image data D14(*n*–1), and the past underfloor image data D15(*n*–1) from the RAM.

Next, the CPU advances the process to step 2675 to generate the circumferential image i0 based on the latest camera image data DO. In addition, the CPU generates the underfloor image i5 based on the past front image data D11(*n*–1), the past right side image data D14(*n*–1), and the past underfloor image data D15(*n*–1) read in step 2670.

Next, the CPU advances the process to step 2680 to extract the latest front image data D11(*n*) and the latest right side image data D14(*n*) from the latest camera image data DO and store the extracted data as the new past front image data D11(*n*–1) and past right side image data D14(*n*–1) in the RAM. In addition, the CPU stores the data D5 on the underfloor image i5 generated in step 2675 in the RAM as the new past underfloor image data D15(*n*–1).

Next, the CPU advances the process to step 2630 to transmit the image display command signal Sd to the display 52. As a result, the circumferential image i0 and the underfloor image i5 generated in step 2675 are displayed on the display 52 in the form of the overhead image i6. Then, the CPU advances the process to step 1695 of FIG. 16 or step 2295 of FIG. 22 through step 2795, and temporarily terminates the present routine.

Figure 27:
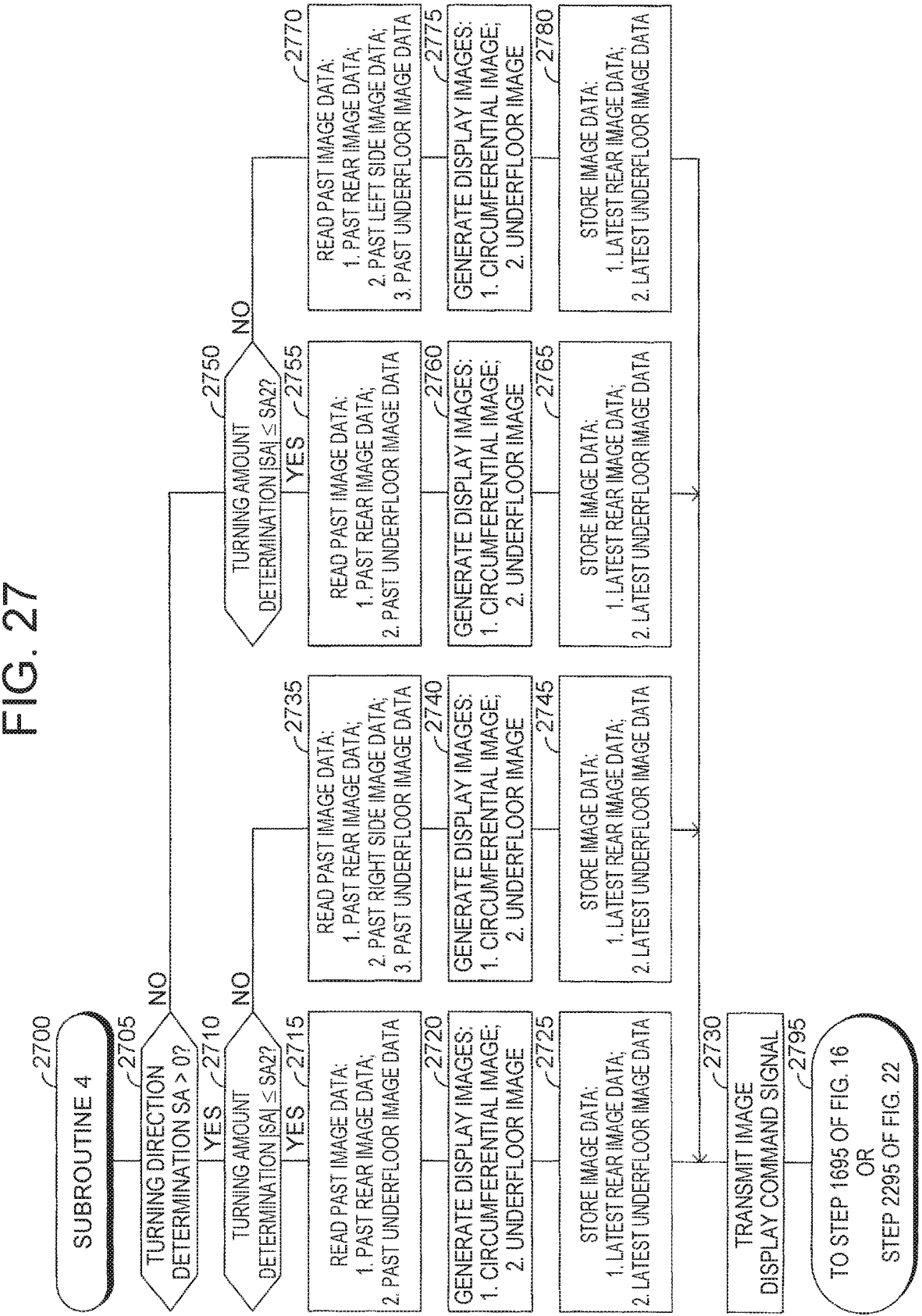
FIG. 27 is a flowchart showing a routine executed by the vehicle periphery monitoring device according to the third modification of the embodiment of the present disclosure.

When determining "No" in step 1630 of FIG. 16 or step 2230 of FIG. 22 (i.e., when the vehicle 100 moves backward while making a left turn or a right turn), the CPU according to the third embodiment advances the process to step 1640 of FIG. 16 or step 2240 of FIG. 22 to execute a routine shown in FIG. 27.

Therefore, when the CPU advances the process to step 1640 of FIG. 16 or step 2240 of FIG. 22, the CPU starts the process from step 2700 of FIG. 27. The CPU then advances the process to step 2705 to determine whether or not the steering angle SA is larger than zero (i.e., whether or not the vehicle 100 moves backward while making a left turn).

When determining "Yes" in step 2705, the CPU advances the process to step 2710 to determine whether or not the absolute value of the steering angle SA is equal to or less than the second steering angle SA2 (i.e., whether or not the degree of the left turn of the vehicle 100 is relatively small).

When determining "Yes" in step 2710 (i.e., when the degree of the left turn of the vehicle 100 is relatively small), the CPU advances the process to step 2715 to read the past rear image data D12(*n*–1) and the past underfloor image data D15(*n*–1) from the RAM.

Next, the CPU advances the process to step 2720 to generate the circumferential image i0 based on the latest camera image data DO. In addition, the CPU generates the underfloor image i5 based on the past rear image data D12(*n*–1) and the past underfloor image data D15(*n*–1) read in step 2715.

Next, the CPU advances the process to step 2725 to extract the latest rear image data D12(*n*) from the camera image data DO and store the extracted data in the RAM as the new past rear image data D12(*n*–1). In addition, the CPU stores the data D5 on the underfloor image i5 generated in step 2720 in the RAM as the new past underfloor image data D15(*n*–1).

Next, the CPU advances the process to step 2730 to transmit the image display command signal Sd to the display 52. As a result, the circumferential image i0 and the underfloor image i5 generated in step 2720 are displayed on the display 52 in the form of the overhead image i6. Then, the CPU advances the process to step 1695 of FIG. 16 or step 2295 of FIG. 22 through step 2795, and temporarily terminates the present routine.

When determining "No" in step 2710 (i.e., when the degree of the left turn of the vehicle 100 is relatively large), the CPU advances the process to step 2735 to read the past rear image data D12(*n*–1), the past right side image data D14(*n*–1), and the past underfloor image data D15(*n*–1) from the RAM.

Next, the CPU advances the process to step 2740 to generate the circumferential image i0 based on the latest camera image data DO. In addition, the CPU generates the underfloor image i5 based on the past rear image data D12(*n*–1), the past right side image data D14(*n*–1), and the past underfloor image data D15(*n*–1) read in step 2735.

Next, the CPU advances the process to step 2745 to extract the latest rear image data D12(*n*) and the latest right side image data D14(*n*) from the latest camera image data DO and store the extracted data as the new past rear image data D12(*n*–1) and past right side image data D14(*n*–1) in the RAM. In addition, the CPU stores the data D5 on the underfloor image i5 generated in step 2740 in the RAM as the new past underfloor image data D15(*n*–1).

Next, the CPU advances the process to step 2730 to transmit the image display command signal Sd to the display 52. As a result, the circumferential image i0 and the underfloor image i5 generated in step 2740 are displayed on the display 52 in the form of the overhead image i6. Then, the CPU advances the process to step 1695 of FIG. 16 or step 2295 of FIG. 22 through step 2795, and temporarily terminates the present routine.

When determining "No" in step 2705 (i.e., when the vehicle 100 moves backward making a right turn), the CPU advances the process to step 2750 to determine whether or not the absolute value of the steering angle SA is equal to or less than the second steering angle SA2 (i.e., whether or not the degree of the right turn of the vehicle 100 is relatively small).

When determining "Yes" in step 2750 (i.e., when the degree of the right turn of the vehicle 100 is relatively small), the CPU advances the process to step 2755 to read the past rear image data D12(*n*–1) and the past underfloor image data D15(*n*–1) from the RAM.

Next, the CPU advances the process to step 2760 to generate the circumferential image i0 based on the latest camera image data DO. In addition, the CPU generates the underfloor image i5 based on the past rear image data D12(n−1) and the past underfloor image data D15(n−1) read in step 2755.

Next, the CPU advances the process to step 2765 to extract the latest rear image data D12(n) from the latest camera image data DO and store the extracted data in the RAM as the new past rear image data D12(n−1). In addition, the CPU stores the data D5 on the underfloor image i5 generated in step 2760 in the RAM as the new past underfloor image data D15(n−1).

Next, the CPU advances the process to step 2730 to transmit the image display command signal Sd to the display 52. As a result, the circumferential image i0 and the underfloor image i5 generated in step 2760 are displayed on the display 52 in the form of the overhead image i6. Then, the CPU advances the process to step 1695 of FIG. 16 or step 2295 of FIG. 22 through step 2795, and temporarily terminates the present routine.

When determining "No" in step 2750 (i.e., when the degree of the right turn of the vehicle 100 is relatively large), the CPU advances the process to step 2770 to read the past rear image data D12(n−1), the past left side image data D13(n−1), and the past underfloor image data D15(n−1) from the RAM.

Next, the CPU advances the process to step 2775 to generate the circumferential image i0 based on the latest camera image data DO. In addition, the CPU generates the underfloor image i5 based on the past rear image data D12(n−1), the past left side image data D13(n−1), and the past underfloor image data D15(n−1) read in step 2770.

Next, the CPU advances the process to step 2780 to extract the latest rear image data D12(n) and the latest left side image data D13(n) from the latest camera image data DO, and store the extracted data as the new past rear image data D12(n−1) and past left side image data D13(n−1) in the RAM. In addition, the CPU stores the data D5 on the underfloor image i5 generated in step 2775 in the RAM as the new past underfloor image data D15(n−1).

Next, the CPU advances the process to step 2730 to transmit the image display command signal Sd to the display 52. As a result, the circumferential image i0 and the underfloor image i5 generated in step 2775 are displayed on the display 52 in the form of the overhead image i6. Then, the CPU advances the process to step 1695 of FIG. 16 or step 2295 of FIG. 22 through step 2795, and temporarily terminates the present routine.

The specific operation of the vehicle periphery monitoring device 10 according to the third modification is as described above. Since only the image data minimum required to generate the underfloor image i5 is stored in the RAM when the vehicle periphery monitoring device 10 according to the third modification executes the routines shown in FIGS. 26 and 27, the amount of data to be stored in the RAM is reduced The present disclosure is not limited to the embodiment disclosed, and various modifications can be adopted within the range of the present disclosure.

What is claimed is:

1. A vehicle periphery monitoring device, configured to generate an image indicating a condition of an underfloor of a vehicle as an underfloor image and display the generated underfloor image on a display, the vehicle periphery monitoring device comprising:

a front camera configured to photograph an area in front of the vehicle;
a rear camera configured to photograph an area behind the vehicle;
a left side camera configured to photograph an area on a left side of the vehicle; and
a right side camera configured to photograph an area on a right side of the vehicle, wherein:
the vehicle periphery monitoring device is configured to store images photographed with the front camera, the rear camera, the left side camera, and the right side camera as a past front image, a past rear image, a past left side image, and a past right side image, prospectively, while storing the generated underfloor image as a past underfloor image; and
when the vehicle travels while making a turn, the vehicle periphery monitoring device is configured to generate the underfloor image using at least one of the past front image, the past rear image, the past left side image, the past right side image, and the past underfloor image in accordance with a turning direction, a traveling direction, and a traveling distance of the vehicle,
wherein:
steering wheels of the vehicle are front wheels;
when the vehicle moves forward while making a left turn, the vehicle periphery monitoring device is configured to store the past front image without storing the past rear image, and store the past left side image without storing the past right side image; and
when the vehicle moves forward while making a right turn, the vehicle periphery monitoring device is configured to store the past front image without storing the past rear image, and store the past right side image without storing the past left side image.

2. The vehicle periphery monitoring device according to claim 1, wherein:
when the traveling speed of the vehicle is equal to or less than a prescribed speed, the vehicle periphery monitoring device is configured to generate the underfloor image; and
when the traveling speed of the vehicle is larger than the prescribed speed, the vehicle periphery monitoring device is configured not to generate the underfloor image.

3. The vehicle periphery monitoring device according to claim 1, wherein when the vehicle travels while making a turn, the vehicle periphery monitoring device is configured to store, among the past front image and the past rear image, only the past front image or the past rear image without storing both the past front image and the past rear image, and store, among the past left side image and the past right side image, only the past left side image or the past right side image without storing both the past left side image and the past right side image, in accordance with the traveling direction of the vehicle and the turning direction of the vehicle.

4. The vehicle periphery monitoring device according to claim 1, wherein
steering wheels of the vehicle are front wheels;
when the vehicle moves backward while making a left turn, the vehicle periphery monitoring device is configured to store the past rear image without storing the past front image, and store the past right side image without storing the past left side image; and
when the vehicle moves backward while making a right turn, the vehicle periphery monitoring device is configured to store the past rear image without storing the past front image, and store the past left side image without storing the past right side image.

5. The vehicle periphery monitoring device according to claim 1, wherein:
when the vehicle travels while making a turn, and a turning radius of the vehicle is smaller than a prescribed radius, the vehicle periphery monitoring device is configured to store, among the past front image and the past rear image, only the past front image or the past rear image without storing both the past front image and the past rear image, and store, among the past front image and the past rear image, only the past left side image or the past right side image without storing both the past left side image and the past right side image, in accordance with the traveling direction of the vehicle and the turning direction of the vehicle; and
when the vehicle travels while making a turn, and the turning radius of the vehicle is equal to or more than the prescribed radius, the vehicle periphery monitoring device is configured to store only one of the past front image and the past rear image without storing the other one of the past front image and the past rear image, and is configured not to store the past left side image and the past right side image, in accordance with the traveling direction of the vehicle.

6. The vehicle periphery monitoring device according to claim 5, wherein the prescribed radius is set to a minimum value of the turning radius that allows generation of the underfloor image without using the past left side image and the past right side image, when the vehicle travels while making a turn.

7. The vehicle periphery monitoring device according to claim 1, wherein the vehicle periphery monitoring device is configured to store, among the images photographed with the front camera, the rear camera, the left side camera, and the right side camera, the images included in a range that covers a range where the vehicle is movable during a time interval of generating the underfloor image, as the past front image, the past rear image, the past left side image, and the past right side image.

8. The vehicle periphery monitoring device according to claim 7, wherein the vehicle periphery monitoring device is configured to delete the past front image, the past rear image, the past left side image, the past right side image, and the past underfloor image that are stored at a time when the underfloor image is generated.

9. A vehicle periphery monitoring device, configured to generate an image indicating a condition of an underfloor of a vehicle as an underfloor image and display the generated underfloor image on a display, the vehicle periphery monitoring device comprising:
a front camera configured to photograph an area in front of the vehicle;
a rear camera configured to photograph an area behind the vehicle;
a left side camera configured to photograph an area on a left side of the vehicle; and
a right side camera configured to photograph an area on a right side of the vehicle, wherein:
the vehicle periphery monitoring device is configured to store images photographed with the front camera, the rear camera, the left side camera, and the right side camera as a past front image, a past rear image, a past left side image, and a past right side image, prospectively, while storing the generated underfloor image as a past underfloor image; and
when the vehicle travels while making a turn, the vehicle periphery monitoring device is configured to generate the underfloor image using at least one of the past front image, the past rear image, the past left side image, the past right side image, and the past underfloor image in accordance with a turning direction, a traveling direction, and a traveling distance of the vehicle;
wherein:
steering wheels of the vehicle are front wheels;
when the vehicle moves forward while making a left turn, and a turning radius is smaller than a prescribed radius, the vehicle periphery monitoring device is configured to store the past front image without storing the past rear image, and store the past left side image without storing the past right side image;
when the vehicle moves forward while making a left turn, and the turning radius of the vehicle is equal to or more than the prescribed radius, the vehicle periphery monitoring device is configured to store the past front image without storing the past rear image, and is configured not to store both the past left side image and the past right side image;
when the vehicle moves forward while making a right turn, and the turning radius is smaller than the prescribed radius, the vehicle periphery monitoring device is configured to store the past front image without storing the past rear image, and store the past right side image without storing the past left side image; and
when the vehicle moves forward while making a right turn, and the turning radius of the vehicle is equal to or more than the prescribed radius, the vehicle periphery monitoring device is configured to store the past front image without storing the past rear image, and is configured not to store both the past left side image and the past right side image.

10. The vehicle periphery monitoring device according to claim 9, wherein:
when the vehicle moves forward while making a left turn, and the turning radius is smaller than the prescribed radius, the vehicle periphery monitoring device is configured to generate the underfloor image using the past front image and the past left side image;
when the vehicle moves forward while making a left turn, and the turning radius is equal to or more than the prescribed radius, the vehicle periphery monitoring device is configured to generate the underfloor image using only the past front image;
when the vehicle moves forward while making a right turn, and the turning radius is smaller than the prescribed radius, the vehicle periphery monitoring device is configured to generate the underfloor image using the past front image and the past right side image; and
when the vehicle moves forward while making a right turn, and the turning radius is equal to or more than the prescribed radius, the vehicle periphery monitoring device is configured to generate the underfloor image using only the past front image.

11. A vehicle periphery monitoring device, configured to generate an image indicating a condition of an underfloor of a vehicle as an underfloor image and display the generated underfloor image on a display, the vehicle periphery monitoring device comprising:
a front camera configured to photograph an area in front of the vehicle;
a rear camera configured to photograph an area behind the vehicle;

a left side camera configured to photograph an area on a left side of the vehicle; and a right side camera configured to photograph an area on a right side of the vehicle, wherein:

the vehicle periphery monitoring device is configured to store images photographed with the front camera, the rear camera, the left side camera, and the right side camera as a past front image, a past rear image, a past left side image, and a past right side image, prospectively, while storing the generated underfloor image as a past underfloor image; and when the vehicle travels while making a turn, the vehicle periphery monitoring device is configured to generate the underfloor image using at least one of the past front image, the past rear image, the past left side image, the past right side image, and the past underfloor image in accordance with a turning direction, a traveling direction, and a traveling distance of the vehicle; wherein steering wheels of the vehicle are front wheels;

when the vehicle moves backward while making a left turn, and a turning radius is smaller than a prescribed radius, the vehicle periphery monitoring device is configured to store the past rear image without storing the past front image, and store the past right side image without storing the past left side image;

when the vehicle moves backward while making a left turn, and the turning radius of the vehicle is equal to or more than the prescribed radius, the vehicle periphery monitoring device is configured to store the past rear image without storing the past front image, and is configured not to store both the past left side image and the past right side image;

when the vehicle moves backward while making a right turn, and the turning radius is smaller than the prescribed radius, the vehicle periphery monitoring device is configured to store the past rear image without storing the past front image, and store the past left side image without storing the past right side image; and when the vehicle moves backward while making a right turn, and the turning radius of the vehicle is equal to or more than the prescribed radius, the vehicle periphery monitoring device is configured to store the past rear image without storing the past front image, and is configured not to store both the past left side image and the past right side image.

12. The vehicle periphery monitoring device according to claim 11, wherein:

when the vehicle moves backward while making a left turn, and the turning radius is smaller than the prescribed radius, the vehicle periphery monitoring device is configured to generate the underfloor image using the past rear image and the past right side image;

when the vehicle moves backward while making a left turn, and the turning radius is equal to or more than the prescribed radius, the vehicle periphery monitoring device is configured to generate the underfloor image using only the past rear image;

when the vehicle moves backward while making a right turn, and the turning radius is smaller than the prescribed radius, the vehicle periphery monitoring device is configured to generate the underfloor image using the past rear image and the past left side image; and when the vehicle moves backward while making a right turn, and the turning radius is equal to or more than the prescribed radius, the vehicle periphery monitoring device is configured to generate the underfloor image using only the past rear image.

* * * * *